(12) United States Patent
Mochida

(10) Patent No.: US 7,574,914 B2
(45) Date of Patent: Aug. 18, 2009

(54) ACCELERATION SENSOR

(75) Inventor: Yoichi Mochida, Chigasaki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/325,383

(22) Filed: Dec. 1, 2008

(65) Prior Publication Data

US 2009/0071251 A1 Mar. 19, 2009

Related U.S. Application Data

(63) Continuation of application No. PCT/JP2007/054201, filed on Mar. 5, 2007.

(30) Foreign Application Priority Data

Jun. 8, 2006 (JP) ............................. 2006-159923

(51) Int. Cl.
*G01P 15/00* (2006.01)
(52) U.S. Cl. .................. 73/514.36; 73/509; 73/510; 73/514.38
(58) Field of Classification Search ................ 73/510, 73/514.36, 495, 504.03, 504.12, 509, 514.06, 73/514.21, 514.23, 514.24, 514.38
See application file for complete search history.

(56) References Cited

U.S. PATENT DOCUMENTS 4,631,834 A * 12/1986 Hayashi et al. ............... 33/503

(Continued)

FOREIGN PATENT DOCUMENTS

JP 06-130083 A 5/1994

(Continued)

OTHER PUBLICATIONS

Official Communication issued in International Patent Application No. PCT/JP2007/054201, mailed on Apr. 3, 2007.

*Primary Examiner*—Hezron Williams
*Assistant Examiner*—Samir M Shah
(74) *Attorney, Agent, or Firm*—Keating & Bennett, LLP

(57) ABSTRACT

An acceleration sensor includes a frame-shaped beam portion disposed above an XY substrate surface of a base in a floating state and a beam-portion supporting/fixing unit arranged to attach the beam portion to the base with support portions so as to be supported on two sides. The acceleration sensor also includes weight portions disposed above the XY substrate surface of the base in a floating state and connecting portions for attaching the weight portions to the beam portion in a cantilever state. The weight portions are movable in three axial directions including an X-axis direction, a Y-axis direction, and a Z-axis direction when the beam portion is deflected. The beam portion is provided with an X-axis-direction acceleration detection unit arranged to detect an acceleration in the X-axis direction, a Y-axis-direction acceleration detection unit arranged to detect an acceleration in the Y-axis direction, and a Z-axis-direction acceleration detection unit arranged to detect an acceleration in the Z-axis direction. The Z-axis-direction acceleration detection unit is disposed near proximal ends of Y-axis-direction extending portions of the beam portion, and the Y-axis-direction acceleration detection unit is disposed near distal ends of the Y-axis-direction extending portions.

12 Claims, 14 Drawing Sheets

U.S. PATENT DOCUMENTS

| | | | |
|---|---|---|---|
| 4,675,874 A * | 6/1987 | POhler et al. | 372/33 |
| 6,848,320 B2 * | 2/2005 | Miyajima et al. | 73/763 |
| 7,331,230 B2 * | 2/2008 | Takeyari et al. | 73/514.33 |
| 7,389,691 B2 * | 6/2008 | Kai | 73/514.36 |
| 2004/0012062 A1 * | 1/2004 | Miyajima et al. | 257/419 |
| 2005/0279166 A1 * | 12/2005 | Shizuno | 73/493 |
| 2006/0130577 A1 * | 6/2006 | Kai | 73/504.14 |
| 2006/0173257 A1 * | 8/2006 | Nagai et al. | 600/323 |
| 2006/0217603 A1 * | 9/2006 | Nagai et al. | 600/323 |
| 2007/0089514 A1 * | 4/2007 | Takeyari et al. | 73/514.33 |

FOREIGN PATENT DOCUMENTS

| | | |
|---|---|---|
| JP | 06-163937 A | 6/1994 |
| JP | 09-269335 A | 10/1997 |
| JP | 11-337571 A | 12/1999 |
| JP | 2002-296293 A | 10/2002 |
| JP | 2007-43017 A | 2/2007 |

* cited by examiner

ACCELERATION SENSOR

BACKGROUND OF THE INVENTION

1. Field of the Invention

The present invention relates to an acceleration sensor capable of detecting accelerations in three axial directions including an X-axis direction, a Y-axis direction, and a Z-axis direction which are perpendicular or substantially perpendicular to one another.

2. Description of the Related Art

FIG. 16 is a schematic perspective view illustrating an example of an acceleration sensor (see, for example, Japanese Unexamined Patent Application Publication No. 2002-296293). An acceleration sensor 40 shown in FIG. 16 includes a frame portion 41 and a columnar weight member 42 disposed at a central portion of the frame portion 41. X-axis-direction beam portions 43a and 43b extend in the X-axis direction from either end of the weight member 42 in the X-axis direction toward the frame portion 41. Y-axis-direction beam portions 44a and 44b extend in the Y-axis direction from either end of the weight member 42 in the Y-axis direction toward the frame portion 41. Four auxiliary weight members 45a to 45d are connected to the weight member 42. Resistance elements Rx1 to Rx4 and Rz1 to Rz4 are provided on the X-axis-direction beam portions 43a and 43b. Resistance elements Ry1 to Ry4 are provided on the Y-axis-direction beam portions 44a and 44b.

In the acceleration sensor 40 shown in FIG. 16, the central axes of the X-axis-direction beam portions 43a and 43b are arranged on a single substantially straight line that passes through the central axis of the columnar weight member 42 and extends substantially in the X-axis direction. In addition, the central axes of the Y-axis-direction beam portions 44a and 44b are arranged on a single substantially straight line that passes through the central axis of the columnar weight member 42 and extends substantially in the Y-axis direction. Each of the X-axis-direction beam portions 43a and 43b and the Y-axis-direction beam portions 44a and 44b are flexible.

The resistance elements Rx1 and Rx2 are arranged in the X-axis direction on the X-axis-direction beam portion 43a. The resistance elements Rx3 and Rx4 are arranged in the X-axis direction on the X-axis-direction beam portion 43b. The resistance elements Ry1 and Ry2 are arranged in the Y-axis direction on the Y-axis-direction beam portion 44a. The resistance elements Ry3 and Ry4 are arranged in the Y-axis direction on the Y-axis-direction beam portion 44b. The resistance elements Rz1 and Rz2 are arranged in the X-axis direction on the X-axis-direction beam portion 43a. The resistance elements Rz3 and Rz4 are arranged in the X-axis direction on the X-axis-direction beam portion 43b. The electrical resistances of the resistance elements Rx1 to Rx4, Ry1 to Ry4, and Rz1 to Rz4 vary in accordance with stress changes caused in the beam portions 43a, 43b, 44a, and 44b when the beam portions 43a, 43b, 44a, and 44b are deflected.

Wirings defining bridge circuits shown in FIGS. 17A to 17C including the resistance elements Rx1 to Rx4, Ry1 to Ry4, and Rz1 to Rz4 are provided on the beam portions 43a, 43b, 44a, and 44b, and the frame portion 41. FIG. 17A shows a bridge circuit including the four resistance elements Rx1 to Rx4. FIG. 17B shows a bridge circuit including the four resistance elements Ry1 to Ry4. FIG. 17C shows a bridge circuit including the four resistance elements Rz1 to Rz4. Reference symbol Vcc shown in FIGS. 17A to 17C indicates a voltage source input that is connected to an external voltage source. Reference symbols Px1, Px2, Py1, Py2, Pz1, and Pz2 indicate voltage detection elements.

The weight member 42 and the auxiliary weight members 45a to 45d are arranged in a floating state such that they can be moved as the beam portions 43a, 43b, 44a, and 44b are deflected. For example, when a force is generated in the X-axis direction due to an acceleration in the X-axis direction and is applied to the weight member 42 and the auxiliary weight members 45a to 45d, the weight member 42 and the auxiliary weight members 45a to 45d are shifted in the X-axis direction due to the applied force. Similarly, when a force is generated in the Y-axis direction due to an acceleration in the Y-axis direction and is applied to the weight member 42 and the auxiliary weight members 45a to 45d, the weight member 42 and the auxiliary weight members 45a to 45d are shifted in the Y-axis direction due to the applied force. In addition, similarly, when a force is generated in the X-axis direction due to an acceleration in the Z-axis direction and is applied to the weight member 42 and the auxiliary weight members 45a to 45d, the weight member 42 and the auxiliary weight members 45a to 45d are shifted in the Z-axis direction due to the applied force. When the weight member 42 and the auxiliary weight members 45a to 45d are shifted as described above, the beam portions 43a, 43b, 44a, and 44b are deflected.

In the acceleration sensor 40, when the beam portions 43a, 43b, 44a, and 44b are deflected as described above and stresses are generated in the beam portions 43a, 43b, 44a, and 44, the resistances of the resistance elements Rx1 to Rx4, Ry1 to Ry4, Rz1 to Rz4 change. When the resistances of the resistance elements Rx1 to Rx4, Ry1 to Ry4, Rz1 to Rz4 change, the resistances of the four resistance elements included in each of the bridge circuits shown in FIGS. 17A to 17C become unbalanced. As a result, the accelerations in the X, Y, and Z axis directions can be detected.

For example, when an acceleration is applied in the X-axis direction, voltages output from the voltage detection elements Px1 and Px2 differ from each other in the bridge circuit shown in FIG. 17A. The amount of acceleration in the X-axis direction can be detected using the voltage difference. When an acceleration is applied in the Y-axis direction, voltages output from the voltage detection elements Py1 and Py2 differ from each other in the bridge circuit shown in FIG. 17B. The amount of acceleration in the Y-axis direction can be detected using the voltage difference. When an acceleration is applied in the Z-axis direction, voltages output from the voltage detection elements Pz1 and Pz2 differ from each other in the bridge circuit shown in FIG. 17C. The amount of acceleration in the Z-axis direction can be detected using the voltage difference.

However, in the structure of the acceleration sensor 40 shown in FIG. 16, the linear beam portions 43a, 43b, 44a, and 44b are respectively arranged on four sides of the weight member 42 so as to connect the weight member 42 to the frame portion 41. Therefore, when the frame portion 41 is distorted due to thermal stress, the beam portions 43a, 43b, 44a, and 44b are also distorted by the distortion of the frame portion 41. As a result, compressive or tensile stress is caused in the beam portions 43a, 43b, 44a, and 44b.

More specifically, in the acceleration sensor 40, the resistance elements Rx1 to Rx4, Ry1 to Ry4, and Rz1 to Rz4 arranged to detect the accelerations are provided on the beam portions 43a, 43b, 44a, and 44b. Therefore, even when no acceleration is applied, if stresses are generated in the beam portions 43a, 43b, 44a, and 44b due to the distortion of the frame portion 41 caused by the thermal stress, the electrical resistances of the resistance elements Rx1 to Rx4, Ry1 to Ry4, and Rz1 to Rz4 will change. As a result, there is a risk that voltages equivalent to those output when accelerations are applied will be output from the bridge circuits shown in FIGS. 17S to 17V even when no acceleration is applied.

In addition, in the acceleration sensor 40, the resistance elements Rx1 to Rx4, Ry1 to Ry4, and Rz1 to Rz4 arranged to detect accelerations are provided on the beam portions 43a, 43b, 44a, and 44b extending from the weight member 42 in four directions. Therefore, the resistance elements are arranged at separate locations.

When the beam portions 43a, 43b, 44a, and 44b are made of silicon, the resistance elements Rx1 to Rx4, Ry1 to Ry4, and Rz1 to Rz4, which are piezoresistive elements, are formed by doping phosphorus (P) or boron (B) into the beam portions 43a, 43b, 44a, and 44b at locations at which the resistance elements are to be arranged. In this case, if the locations at which the resistance elements are to be arranged are separate from each other, it is difficult to dope phosphorus or boron uniformly at each location. Therefore, the doping concentration differs at each of the locations at which the resistance elements are arranged.

In such a case, in the acceleration sensor 40, it is difficult to obtain a balanced state between the resistances of the four resistance elements in each of the bridge circuits shown in FIGS. 17A to 17C. Therefore, the accuracy of acceleration detection cannot be sufficiently increased.

SUMMARY OF THE INVENTION

To overcome the problems described above, preferred embodiments of the present invention provide an acceleration sensor that includes a base, a frame-shaped beam portion disposed above a surface of the base in a floating state, a beam-portion supporting/fixing unit arranged to attach the beam portion to the base so as to be supported on two sides with support portions, the support portions extending outward in an X-axis direction from either side of the beam portion, the X axis, a Y axis, and a Z axis being perpendicular or substantially perpendicular to one another, connecting portions provided above the surface of the base in a floating state and extending outward in the Y-axis direction from either side of the beam portion in the Y-axis direction; and weight portions that are connected to distal ends of the respective connecting portions.

The weight portions are movable in three axial directions including the X-axis direction, the Y-axis direction, and the Z-axis direction when the frame-shaped beam portion is deformed.

The beam portion is provided with an X-axis-direction acceleration detection unit arranged to detect an acceleration in the X-axis direction based on deflection of the beam portion caused by the movements of the weight portions in the X-axis direction, a Y-axis-direction acceleration detection unit arranged to detect an acceleration in the Y-axis direction based on deflection of the beam portion caused by the movements of the weight portions in the Y-axis direction, and a Z-axis-direction acceleration detection unit arranged to detect an acceleration in the Z-axis direction based on deflection of the beam portion caused by the movements of the weight portions in the Z-axis direction.

The Z-axis-direction acceleration detection unit is provided near proximal ends of Y-axis-direction extending portions of the frame-shaped beam portion and the Y-axis-direction acceleration detection unit is provided near distal ends of the Y-axis-direction extending portions, the Y-axis-direction extending portions extending in the Y-axis direction from locations at which the frame-shaped beam portion is supported by the support portions.

According to preferred embodiments of the present invention, the frame-shaped beam portion is preferably attached to the base so as to be supported on two sides with the support portions that extend in the X-axis direction on either side of the beam portion. Therefore, when, for example, the base is distorted by thermal stress, the distortion in the Y-axis direction (for example, in the longitudinal direction) is absorbed by the deflection of the support portions. With respect to the distortion in the X-axis direction (for example, in the transverse direction), an overall displacement caused by the distortion is relatively small. In addition, portions of the beam portion separated from the regions at which the support portions and the connecting portions are connected to the beam portion are deformed due to the distortion in the X-axis direction, so that the distortion in the X-axis direction can be absorbed. Therefore, according to preferred embodiments of the present invention, the beam portion can be prevented from being distorted in the regions at which the support portions and the connecting portions are connected to the beam portion or in regions adjacent thereto.

In addition, the X-axis-direction acceleration detection unit, the Y-axis-direction acceleration detection unit, and the Z-axis-direction acceleration detection unit arranged to detect the accelerations based on the distortion of the beam portion are preferably provided on the beam portion. The acceleration detection units are preferably provided on the beam portion in regions at which distortion caused by distortion of the base due to thermal stress or other external forces is zero or extremely small. Therefore, according to preferred embodiments of the present invention, the occurrence of false detection of acceleration due to the distortion of the base caused by thermal stress can be effectively suppressed. The false detection of acceleration means a situation in which even when no acceleration is applied, an acceleration is detected by the X-axis-direction acceleration detection unit, the Y-axis-direction acceleration detection unit, or the Z-axis-direction acceleration detection unit due to the distortion of the base caused by thermal stress.

In addition, according to preferred embodiments of the present invention, the frame-shaped beam portion is preferably attached to the base so as to be supported on two sides, and the weight portions are preferably retained by the beam portion in a cantilever state. Thus, the structure is simple. Therefore, the size of the acceleration sensor can be reduced.

In addition, the weight portions are preferably connected to the frame-shaped beam portion in a cantilever manner. Therefore, the displacements of the weight portions caused by the accelerations are relatively large. Accordingly, the deflection of the beam portion caused by the displacements of the weight portions is increased, and the acceleration detection sensitivity can be increased.

The Y-axis-direction acceleration detection unit is preferably disposed near the distal ends of the Y-axis-direction extending portions extending in the Y-axis direction from the locations at which the frame-shaped beam portion is supported by the support portions. In the region in which the Y-axis-direction acceleration detection unit is disposed, the density of wiring connected to the acceleration detection unit can be reduced. Therefore, the beam width, for example, can be reduced. By reducing the width of the Y-axis-direction extending portions at the distal ends thereof, the acceleration detection sensitivity in the Y-axis direction can be increased. By comparison, the Z-axis-direction acceleration detection unit is preferably disposed near the proximal ends of the Y-axis-direction extending portions. In the region in which the Z-axis-direction acceleration detection unit is disposed, the wiring density is increased. Therefore, the beam width of the Y-axis-direction extending portions at the proximal ends thereof cannot be set as small as that of the Y-axis-direction extending portions at the distal ends thereof. However, the bending moment is at a maximum at the proximal ends of the Y-axis-direction extending portions. Therefore, the acceleration detection sensitivity in the Z-axis direction can be increased to a level that is substantially equivalent to that in the Y-axis direction by, for example, increasing the size of the weights in the Y-axis direction.

Therefore, according to preferred embodiments of the present invention, even when the elements provided on the base are arranged in a low-profile structure (i.e., even when the thickness in the Z-axis direction is reduced), an acceleration sensor having a high, uniform acceleration detection sensitivity in the X, Y, and Z axis directions can be obtained.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will be described below with reference to the drawings.

Figure 1A:
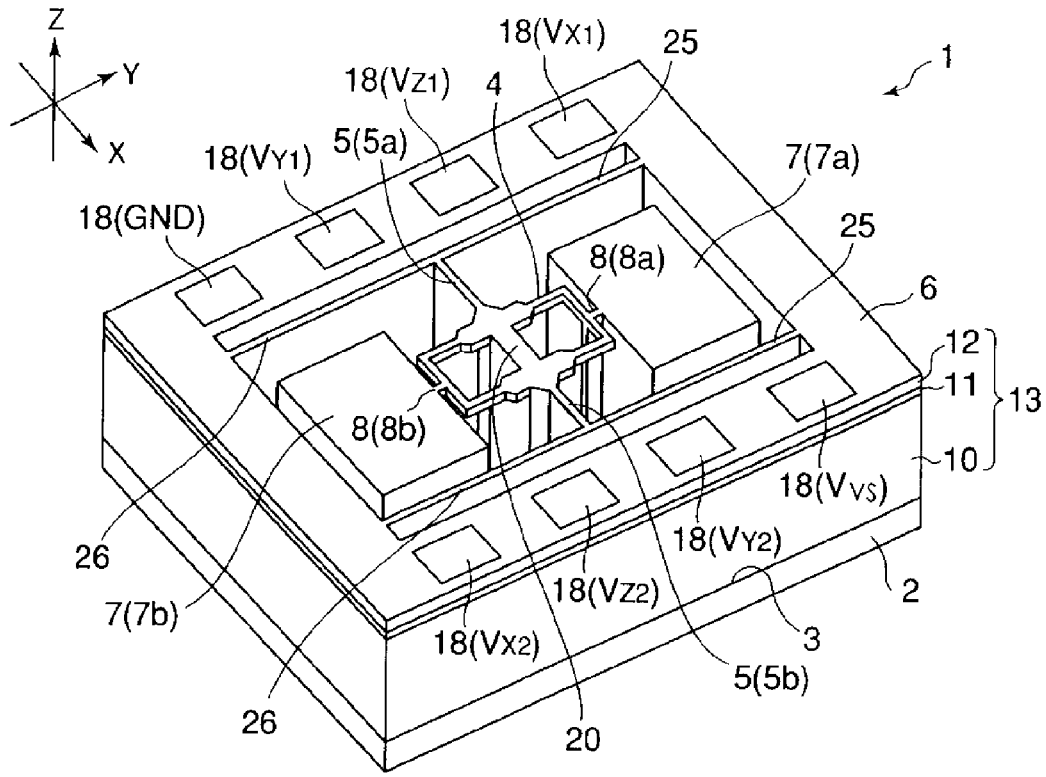
FIG. 1A is a schematic perspective view illustrating an acceleration sensor according to a preferred embodiment of the present invention.
Figure 1B:
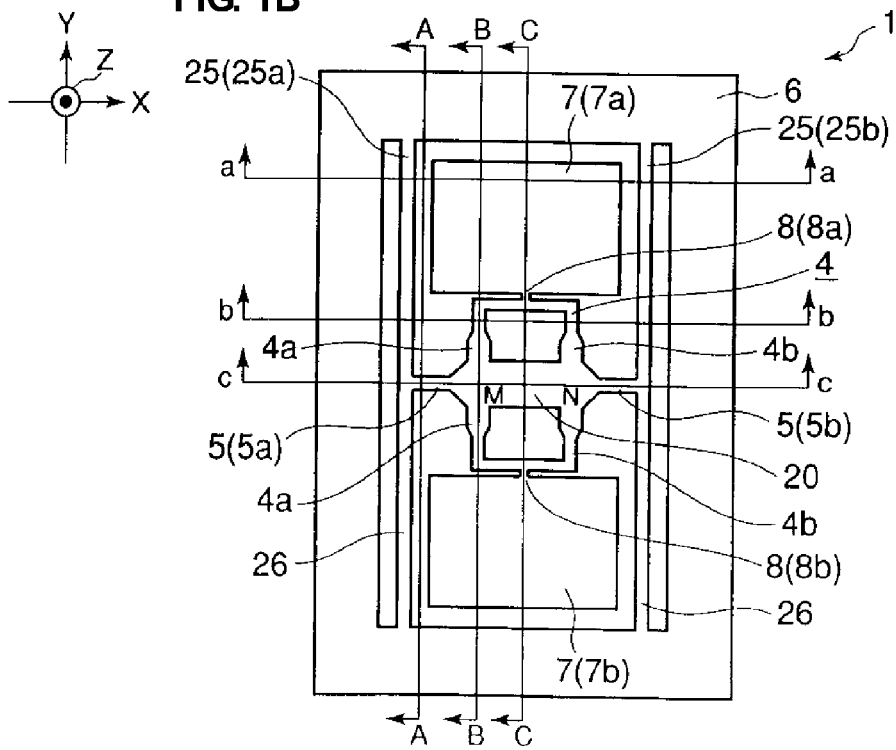
FIG. 1B is a schematic plan view illustrating the acceleration sensor according to a preferred embodiment of the present invention.
Figure 2A:
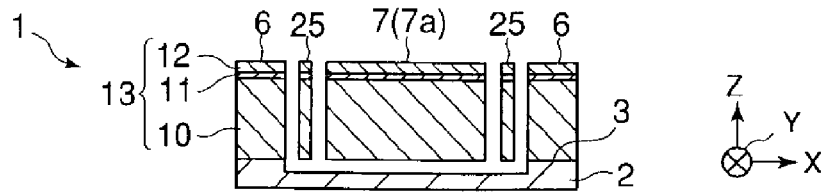
FIG. 2A is a cross sectional view of the acceleration sensor according to a preferred embodiment of the present invention.
Figure 2B:
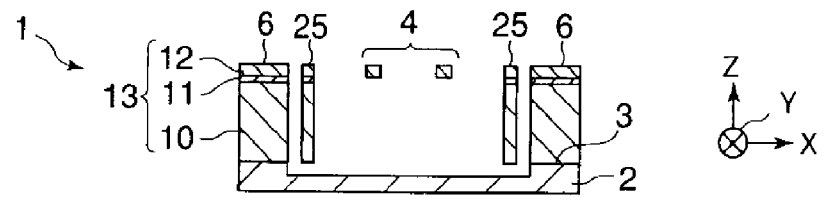
FIG. 2B is another cross sectional view of the acceleration sensor according to a preferred embodiment of the present invention.
Figure 2C:
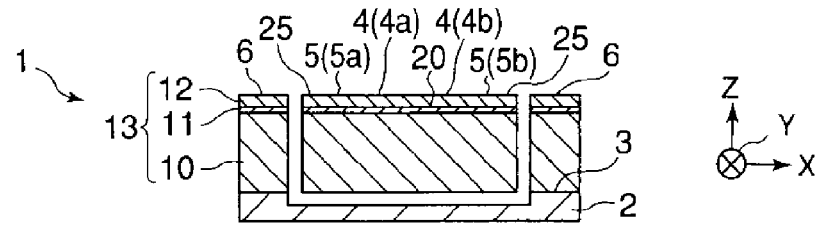
FIG. 2C is another cross sectional view of the acceleration sensor according to a preferred embodiment of the present invention.
Figure 3A:
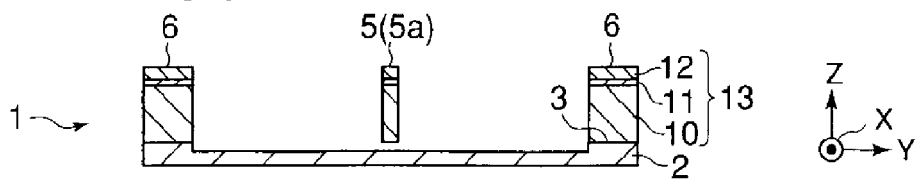
FIG. 3A is a longitudinal sectional view of the acceleration sensor according to a preferred embodiment of the present invention.
Figure 3B:
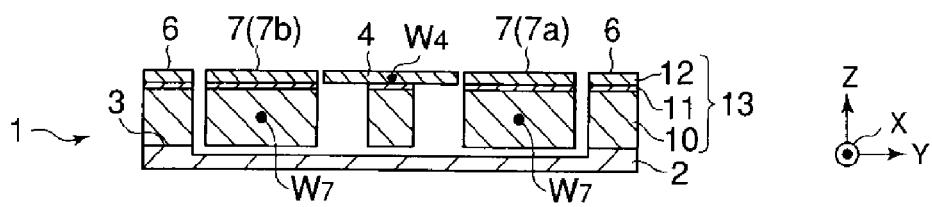
FIG. 3B is another longitudinal sectional view of the acceleration sensor according to a preferred embodiment of the present invention.
Figure 3C:
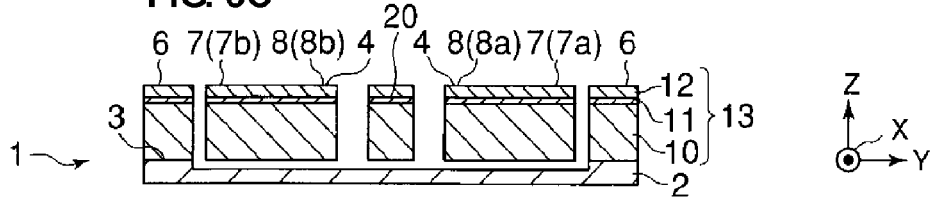
FIG. 3C is another longitudinal sectional view of the acceleration sensor according to a preferred embodiment of the present invention.

FIG. 1A is a schematic perspective view illustrating an acceleration sensor according to a preferred embodiment of the present invention. FIG. 1B is a schematic plan view illustrating the acceleration sensor shown in FIG. 1A. In FIG. 1B, electrode pads denoted by reference numeral 18 in FIG. 1A are omitted. FIG. 2A is a schematic sectional view of FIG. 1B taken along line a-a. FIG. 2B is a schematic sectional view of FIG. 1B taken along line b-b. FIG. 2C is a schematic sectional view of FIG. 1B taken along line c-c. In addition, FIG. 3A is a schematic sectional view of FIG. 1B taken along line A-A. FIG. 3B is a schematic sectional view of FIG. 1B taken along line B-B. FIG. 3C is a schematic sectional view of FIG. 1B taken along line C-C.

An acceleration sensor 1 according to the present preferred embodiment is capable of detecting accelerations in three axial directions of an X axis, a Y axis, and a Z axis which are perpendicular substantially perpendicular to one another. The acceleration sensor 1 includes a base 2. The base 2 has an XY substrate surface 3 that is substantially parallel to an XY plane defined by the X axis and the Y axis. A frame-shaped beam portion 4 is disposed above the XY substrate surface 3 in a floating state. The frame-shaped beam portion 4 has a substantially rectangular shape in the XY plane. Support portions 5 (5a and 5b) are provided on either side of the beam portion 4 in the X-axis direction so as to extend outward in the X-axis direction.

The support portions 5a and 5b are disposed above the base 2 in a floating state. The distal ends of the support portions 5a and 5b are respectively connected to central portions of elastic portions 25 in a longitudinal direction thereof. The elastic portions 25 include beams (stress-reducing beams) 26. The support portions 5a and 5b are tapered such that the dimensions thereof are increased toward the beam portion 4 in regions at which the support portions 5a and 5b are connected to the beam portion 4. The width of the support portions 5a and 5b at the ends connected to the frame-shaped beam portion 4 is greater than the width of the support portions 5a and 5b at the distal ends thereof (at the ends connected to the elastic portions 25).

The beams 26 defining the elastic portions 25 (25a and 25b) extend in a direction that crosses the direction in which the support portions 5 (5a and 5b) extend (X-axis direction). In this example, the beams 26 extend in the Y-axis direction that is substantially perpendicular to the X-axis direction. The beams 26 are fixed to a fixed portion 6 at the distal ends thereof. The fixed portion 6 is frame-shaped and surrounds a region in which the beam portion 4 and weight portions 7 (7a and 7b), which will be described below, are disposed with intervals therebetween. The fixed portion 6 is fixed to the base 2.

In the present preferred embodiment, the beam portion 4 is fixed to the fixed portion 6 with the support portions 5 (5a and 5b) and the elastic portions 25. In other words, the beam portion 4 is fixed to the base 2 so as to be supported on two sides by the support portions 5a and 5b and the elastic portions 25. In the present preferred embodiment, the support portions 5 (5a and 5b), the elastic portions 25, and the fixed portion 6 define a beam-portion supporting/fixing unit.

A reinforcing portion 20 is disposed in a space surrounded by the frame-shaped beam portion 4. The reinforcing portion 20 extends in a direction in which the support portions 5a and 5b are arranged on either side of the beam portion 4. The reinforcing portion 20 is connected to the frame-shaped beam portion 4 at both ends thereof. The reinforcing portion 20 extends along a substantially straight line that connects a portion M (see FIG. 1B) of the beam portion 4 to which the support portion 5a is connected and a portion N (see FIG. 1B) of the beam portion 4 to which the support portion 5b is connected. The ends of the reinforcing portion 20 are respectively connected to inner sides of the beam portion 4. In the present preferred embodiment, the width of the reinforcing portion 20 in the Y-axis direction is substantially equal to the width of the support portions 5a and 5b at the ends connected to the beam portion 4.

The weight portions 7a and 7b are arranged in the Y-axis direction with the beam portion 4 disposed therebetween. The weight portions 7a and 7b are disposed above the XY substrate surface 3 of the base 2 in a floating state. The weight portions 7a and 7b are respectively connected to the beam portion 4 with connecting portions 8 (8a and 8b). The connecting portions 8 (8a and 8b) are provided on either side of the beam portion 4 in the Y-axis direction so as to extend outward in the Y-axis direction. The connecting portions 8 (8a and 8b) are disposed above the base 2 in a floating state. The weight portions 7a and 7b are capable of moving in three axial directions including the X-axis direction, the Y-axis direction, and the Z-axis direction, when the beam portion 4 is deflected.

In the present preferred embodiment, central axes of the support portions 5a and 5b and the reinforcing portion 20 in the X-axis direction are substantially aligned with each other. In addition, central axes of the connecting portions 8a and 8b in the Y-axis direction are also substantially aligned with each other. The beam portion 4 is symmetric about an X-direction central axis that passes through the central axes of the support portions 5a and 5b. In addition, the beam portion 4 is symmetric about a Y-axis central axis that passes through the central axes of the connecting portions 8a and 8b.

Figure 4A:
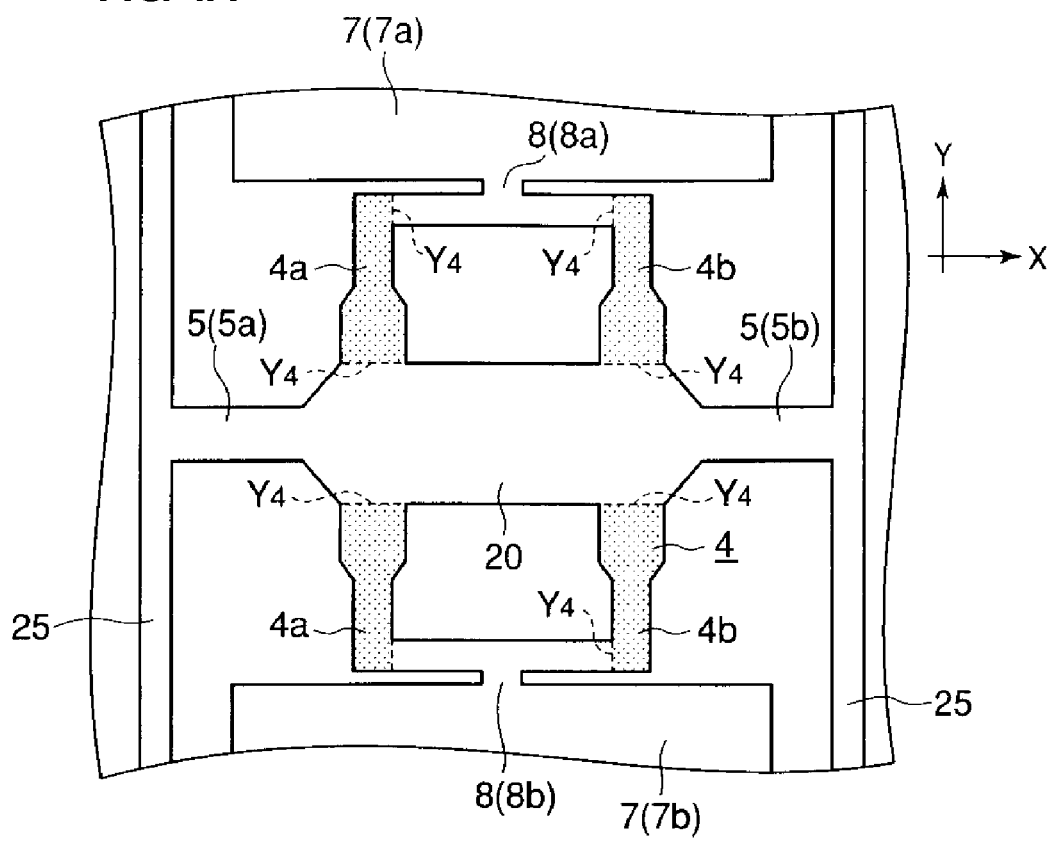
FIG. 4A is a diagram illustrating a structural example regarding the width of a beam portion included in the acceleration sensor according to the preferred embodiment of a present invention.

The frame-shaped beam portion 4 has Y-axis-direction extending portions 4a and 4b (see sections surrounded by dotted lines Y4 in FIG. 4a) that extend in the Y-axis direction from locations at which the beam portion 4 is supported by the support portions 5a and 5b. The width of the Y-axis-direction extending portions 4a and 4b at the distal ends thereof is less than that at the proximal ends thereof. More specifically, the Y-axis-direction extending portions 4a and 4b are configured as described below. That is, in areas from the proximal ends of the Y-axis-direction extending portions 4a and 4b to intermediate regions in the extending direction thereof, the beam portion 4 is substantially straight and has a relatively large width. In the intermediate regions in the extending direction, the Y-axis-direction extending portions 4a and 4b are tapered such that the widths thereof are reduced toward the distal ends. In areas from the tapered regions to the distal ends in the Y-axis direction, the beam portion 4 is substantially straight and has a relatively small width.

Figure 4B:
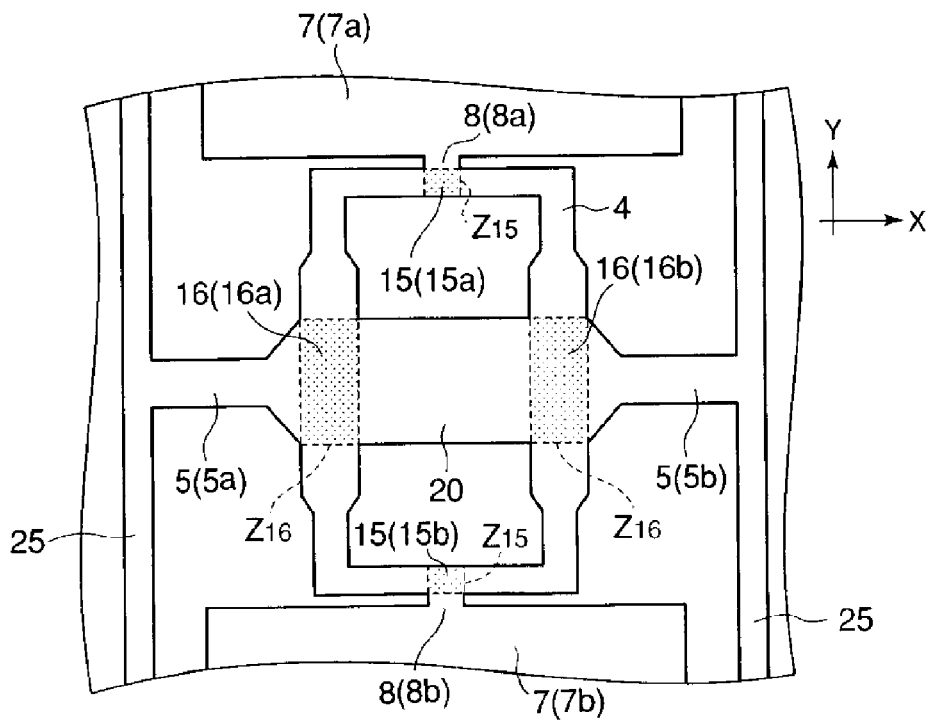
FIG. 4B is a diagram illustrating a structural example regarding the thickness of the beam portion included in the acceleration sensor according to a preferred embodiment of the present invention.

The beam portion 4 includes connecting-portion-side band-shaped portions 15 (15a and 15b) (see sections surrounded by dotted lines Z15 in FIG. 4B) which extend into the region of the beam portion 4 from the connecting portions 8a and 8b, respectively, in the Y-axis direction and which have substantially the same width as that of the connecting portions 8a and 8b. In the present preferred embodiment, the thickness of the connecting-portion-side band-shaped portions 15 (15a and 15b) in the Z-axis direction is substantially the same as the thickness of the connecting portions 8 in the Z-axis direction. The beam portion 4 also includes support-portion-side band-shaped portions 16 (16a and 16b) (see sections surrounded by dotted lines Z16 in FIG. 4B) which extend into the region of the beam portion 4 from the support portions 5a and 5b, respectively, in the X-axis direction and which have substantially the same width as that of the support portions 5a and 5b at the proximal ends thereof. In the present preferred embodiment, the thickness of the support-portion-side band-shaped portions 16 (16a and 16b) in the Z-axis direction is substantially the same as the thickness of the support portions 5 in the Z-axis direction.

In the present preferred embodiment, the thickness of the connecting-portion-side band-shaped portions 15 (15a and 15b) and the support-portion-side band-shaped portions 16 (16a and 16b) of the beam portion 4 in the Z-axis direction is preferably about 400 μm, for example. In comparison, the thickness of other portions of the beam portion 4 in the Z-axis direction is preferably about 5 μm to about 10 μm, for example. Thus, the thickness of the connecting-portion-side band-shaped portions 15 (15a and 15b) and the support-portion-side band-shaped portions 16 (16a and 16b) of the beam portion 4 in the Z-axis direction is greater than the thickness of other portions of the beam portion 4 in the Z-axis direction.

Figure 3D:
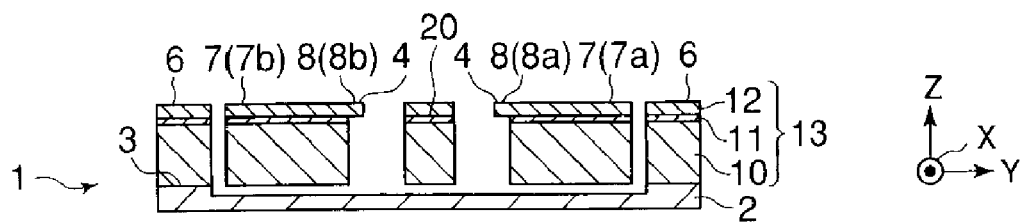
FIG. 3D is a longitudinal sectional view of an acceleration sensor according to a modification of a preferred embodiment of the present invention.

In the beam portion 4, it is not necessary to increase the thickness of the connecting-portion-side band-shaped portions 15 (15a and 15b). For example, the thickness of the connecting-portion-side band-shaped portions 15 (15a and 15b) may also be substantially equal to the thickness of portions of the beam portion 4 other than the support-portion-side band-shaped portions 16 (16a and 16b) in the Z-axis direction (for example, about 5 μm to about 10 μm). Similarly, the thickness of the connecting portions 8a and 8b may also be relatively small. If the thickness of the connecting portions 8a and 8b and the connecting-portion-side band-shaped portions 15 (15a and 15b) is set to a relatively small value, such as about 5 μm to about 10 μm, FIG. 3D is obtained as a cross sectional view of FIG. 1B taken along line C-C.

In the present preferred embodiment, the thickness of the reinforcing portion 20 in the Z-axis direction and the thickness of the beams 26 in the Z-axis direction are preferably about 400 μm, for example, which is similar (i.e., equal or substantially equal) to the thickness of the support portions 5a and 5b and the support-portion-side band-shaped portions 16 of the beam portion 4.

In addition, according to the present preferred embodiment, the thickness of the weight portions 7 in the Z-axis direction is preferably about 400 μm, for example. Accordingly, the thickness of the weight portions 7 in the Z-axis direction is substantially similar to the thickness of the support portions 5 and the connecting portions 8 in the Z-axis direction. The centers of gravity of the weight portions 7 (7a and 7b) are at, for example, locations denoted by $W_7$ in FIG. 3B. In addition, a support point of the beam portion 4 which supports the weight portions 7 (7a and 7b) is at a location denoted by $W_4$ in FIG. 3B. Thus, the vertical locations (i.e., locations in the Z axis direction) of the centers of gravity of the weight portions 7 are shifted from that of the support point of the beam portion 4 which supports the weight portions 7 (7a and 7b).

In the present preferred embodiment, the above-described beam portion 4, the support portions 5 (5a and 5b), the fixed portion 6, the weight portions 7 (7a and 7b), and the connecting portions 8 (8a and 8b) are preferably formed by processing a Silicon-On-Insulator (SOI) substrate 13 using a micromachining technique, for example. The SOI substrate 13 is a multilayer substrate in which an Si layer 10, an $SiO_2$ layer 11, and an Si layer 12 are laminated in that order.

In the present preferred embodiment, the beam portion 4 is preferably made of Si, for example. Piezoresistive elements arranged to detect accelerations are provided on the beam portion 4 by processing the beam portion 4 at locations described below. As shown in the schematic enlarged view of FIG. 5, piezoresistive elements $R_{X1}$ and $R_{X2}$ are disposed on either side of the connecting-portion-side band-shaped portion 15a in the beam portion 4. In addition, piezoresistive elements $R_{X3}$ and $R_{X4}$ are disposed on either side of the connecting-portion-side band-shaped portion 15b. These four piezoresistive elements $R_{X1}$, $R_{X2}$, $R_{X3}$, and $R_{X4}$ define an X-axis-direction acceleration detection unit arranged to detect an acceleration in the X-axis direction.

In addition, in the beam portion 4, piezoresistive elements $R_{Y2}$ and $R_{Y3}$ are respectively disposed on the Y-axis-direction extending portions 4a at locations near the distal ends thereof. Piezoresistive elements $R_{Y1}$ and $R_{Y4}$ are respectively disposed on the Y-axis-direction extending portions 4b at locations near the distal ends thereof. These four piezoresistive elements $R_{Y1}$, $R_{Y2}$, $R_{Y3}$, and $R_{Y4}$ define a Y-axis-direction acceleration detection unit arranged to detect an acceleration in the Y-axis direction.

In addition, piezoresistive elements $R_{Z2}$ and $R_{Z3}$ are disposed on either side of the support-portion-side band-shaped portion 16a, that is, on the Y-axis-direction extending portions 4a of the beam portion 4 at locations near the proximal ends thereof. Piezoresistive elements $R_{Z1}$ and $R_{Z4}$ are disposed on either side of the support-portion-side band-shaped portion 16b, that is, on the Y-axis-direction extending portions 4b at locations near the proximal ends thereof. These four piezoresistive elements $R_{Z1}$, $R_{Z2}$, $R_{Z3}$, and $R_{Z4}$ define a Z-axis-direction acceleration detection unit arranged to detect an acceleration in the Z-axis direction. The piezoresistive elements $R_{Z1}$ and $R_{Z3}$ are arranged so as to extend in the X-axis direction. The piezoresistive elements $R_{Z2}$ and $R_{Z4}$ are arranged so as to extend in the Y-axis direction, which is substantially perpendicular to the direction in which the piezoresistive elements $R_{Z1}$ and $R_{Z3}$ extend.

Figure 6A:
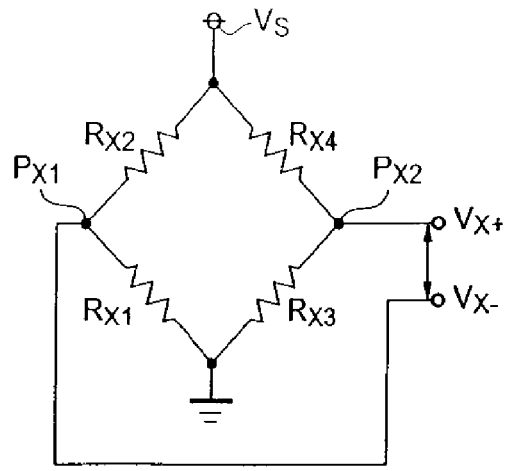
FIG. 6A is a circuit diagram illustrating a bridge circuit that defines an X-axis-direction acceleration detection unit included in the acceleration sensor according to a preferred embodiment of the present invention.
Figure 6B:
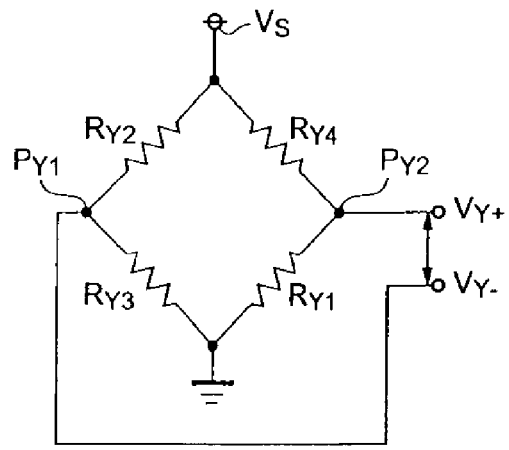
FIG. 6B is a circuit diagram illustrating a bridge circuit that defines a Y-axis-direction acceleration detection unit included in the acceleration sensor according to a preferred embodiment of the present invention.
Figure 6C:
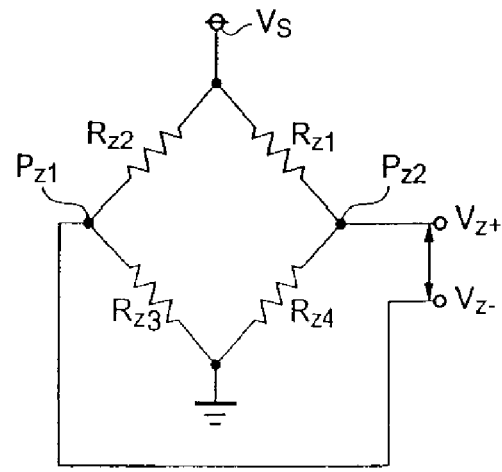
FIG. 6C is a circuit diagram illustrating a bridge circuit that defines a Z-axis-direction acceleration detection unit included in the acceleration sensor according to a preferred embodiment of the present invention.

Wiring patterns shown in FIGS. 6A, 6B, and 6C are provided on the beam portion 4, the support portions 5 (5a and 5b), the reinforcing portion 20, the elastic portions 25, and the fixed portion 6. FIG. 6A shows a wiring pattern defining a bridge circuit including the piezoresistive elements $R_{X1}$, $R_{X2}$, $R_{X3}$, and $R_{X4}$. FIG. 6B shows a wiring pattern defining a bridge circuit including the piezoresistive elements $R_{Y1}$, $R_{Y2}$, $R_{Y3}$, and $R_{Y4}$. FIG. 6C shows a wiring pattern defining a bridge circuit including the piezoresistive elements $R_{Z1}$, $R_{Z2}$, $R_{Z3}$, and $R_{Z4}$.

In the present preferred embodiment, the piezoresistive elements are arranged such that electrical resistances of the four piezoresistive elements defining each of the bridge circuits shown in FIGS. 6A, 6B, and 6C are balanced when no acceleration is applied.

Figure 7A:
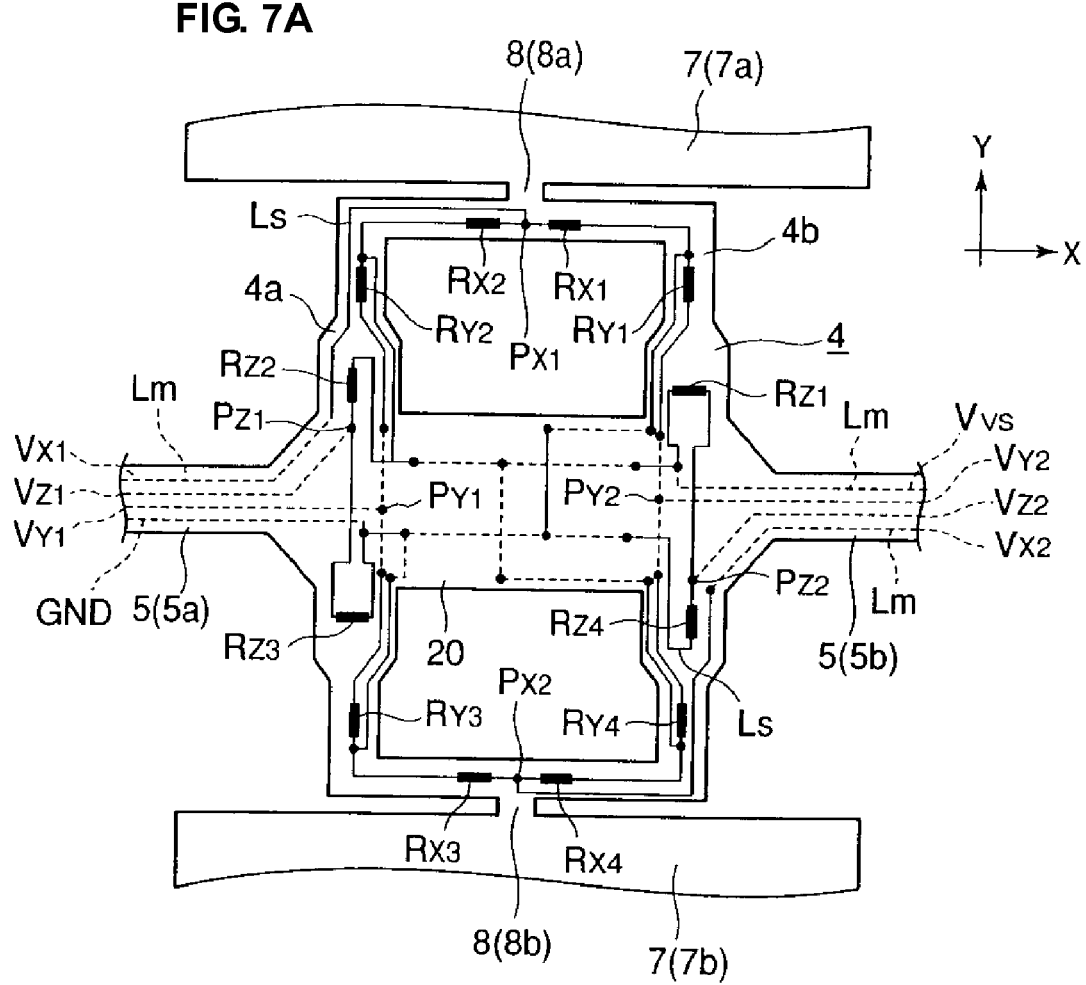
FIG. 7A is a schematic plan view illustrating an example of wiring patterns for connecting the piezoresistive elements provided on the beam portion with one another so as to define the bridge circuits shown in FIGS. 6A to 6C.

For example, FIG. 7A is a schematic diagram illustrating an example of wiring patterns of the bridge circuits. In this example, a wiring pattern Ls and a wiring pattern Lm are arranged to define the above-described bridge circuits including the piezoresistive elements. As shown in the schematic sectional view of FIG. 7B, the wiring pattern Ls is preferably formed by doping boron, phosphorus, or other suitable material, for example, into the Si layer 12 of the SOI substrate 13. The wiring pattern Lm is preferably made of metal, such as aluminum, for example, and is preferably formed on the surface of the SOI substrate 13 using a film deposition technique, such as vapor deposition and sputtering, for example. In FIG. 7A, the wiring pattern Ls is shown by solid lines and the wiring pattern Lm is shown by dashed lines.

Figure 7B:
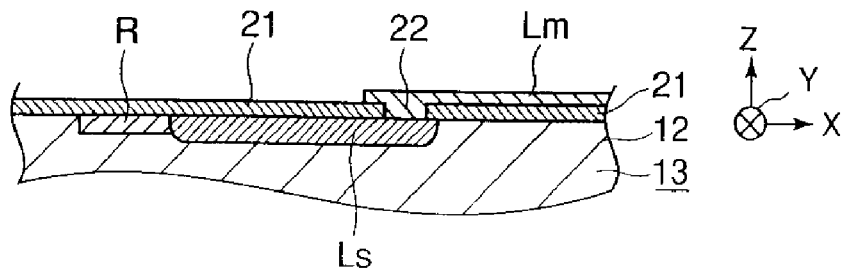
FIG. 7B is a schematic sectional view illustrating the example of the wiring patterns for connecting the piezoresistive elements provided on the beam portion with one another so as to define the bridge circuits shown in FIGS. 6A to 6C.

In the example shown in FIG. 7A, wiring patterns Ls and Lm having features as described below are obtained by utilizing the characteristics of the wiring pattern Ls and the wiring pattern Lm. As shown in FIG. 7B, after the wiring pattern Ls is formed, an oxidized film 21 is preferably formed on the surface of the Si layer 12 of the SOI substrate 13. Therefore, the wiring pattern Ls and the wiring pattern Lm can be arranged so as to cross each other with insulation defined by the oxidized film 21 provided between the wiring pattern Ls and the wiring pattern Lm.

A hole 22 is formed by removing a portion of the oxidized film 21 in an area in which the wiring pattern Ls is formed. A conductive material defining the wiring pattern Lm is supplied to the hole 22, and is bonded to the wiring pattern Ls. Thus, the wiring pattern Ls and the wiring pattern Lm are electrically connected to each other.

As described above, in the present preferred embodiment, the thickness of the support portions 5a and 5b, the connecting-portion-side band-shaped portions 15a and 15b and the support-portion-side band-shaped portions 16a and 16b in the beam portion 4, the reinforcing portion 20, and the elastic portions 25 is preferably about 400 μm, or example. In comparison, the thickness of the portions of the beam portion 4 other than the connecting-portion-side band-shaped portions 15a and 15b and the support-portion-side band-shaped portions 16a and 16b is preferably about 5 μm to about 10 μm, for example. If the wiring pattern Lm made of metal is formed on the surface of the above-described thin portions of the beam portion 4, there is a risk that the thin portions of the beam portion 4 will be warped due to the internal stress of the wiring pattern Lm.

In comparison, the wiring pattern Ls is preferably formed by doping impurities, such as boron and phosphorus, for example, into the Si layer that forms the beam portion 4. Accordingly, even when the wiring pattern Ls is formed, the thin portions of the beam portion 4 are not significantly warped. Therefore, the wiring pattern Lm made of metal is not formed on the thin portions of the beam portion 4, but the wiring pattern Ls is formed on the thin portions of the beam portion 4.

As described above, in the example shown in FIG. 7A, the fact that the wiring pattern Ls and the wiring pattern Lm can be arranged so as to cross each other and that an electric connection between the wiring pattern Ls and the wiring pattern Lm can be readily provided are utilized. In addition, in the example shown in FIG. 7A, the fact that the beam portion 4 has different thicknesses depending on the portions thereof is taken into account. The wiring structure of the wiring pattern Ls and the wiring pattern Lm is designed so as to achieve a simplified arrangement of the wiring structure while considering the above-described factors.

In the example of the wiring structure shown in FIG. 7A, the piezoresistive elements $R_{X1}$ and $R_{X2}$ disposed on either side of the connecting-portion-side band-shaped portion 15a are electrically connected to each other by the wiring pattern Ls at ends thereof, thereby forming a voltage detection element $P_{X1}$. As shown in FIG. 1A, the electrode pads 18 that provide external connections are arranged on the surface of the fixed portion 6. The voltage detection element $P_{X1}$ is electrically connected to the electrode pad 18 ($V_{X1}$) with the wiring patterns Ls and Lm, the electrode pad 18 ($V_{X1}$) providing external connection corresponding to the voltage detection element $P_{X1}$. Similarly, the piezoresistive elements $R_{X3}$ and $R_{X4}$ disposed on either side of the connecting-portion-side band-shaped portion 15b are electrically connected to each other by the wiring pattern Ls at ends thereof, thereby defining a voltage detection element $P_{X2}$. The voltage detection element $P_{X2}$ is electrically connected to the electrode pad 18 ($V_{X2}$) with the wiring patterns Ls and Lm, the electrode pad 18 ($V_{X2}$) providing external connection corresponding to the voltage detection element $P_{X2}$.

The other ends of the piezoresistive elements $R_{X2}$ and $R_{X4}$ are electrically connected to the electrode pad 18 ($V_{VS}$) with the wiring patterns Ls and Lm, the electrode pad 18 ($V_{VS}$) providing connection to an external voltage source Vs. In addition, the other ends of the piezoresistive elements $R_{X1}$ and $R_{X3}$ are connected to the electrode pad 18 ($V_{GND}$) with the wiring patterns Ls and Lm, the electrode pad 18 ($V_{GND}$) providing connection to an external ground GND.

The piezoresistive elements $R_{Y2}$ and $R_{Y3}$ disposed at the outer ends of the Y-axis-direction extending portions 4a are electrically connected to each other by the wiring patterns Ls and Lm at ends thereof, thereby forming a voltage detection element $P_{Y1}$. The voltage detection element $P_{Y1}$ is electrically connected to the electrode pad 18 ($V_{Y1}$) with the wiring pattern Lm, the electrode pad 18 ($V_{Y1}$) providing external connection corresponding to the voltage detection element $P_{Y1}$.

Similarly, the piezoresistive elements $R_{Y1}$ and $R_{Y4}$ disposed at the outer ends of the Y-axis-direction extending portions 4b are electrically connected to each other by the wiring patterns Ls and Lm at ends thereof, thereby defining a voltage detection element $P_{Y2}$. The voltage detection element $P_{Y2}$ is electrically connected to the electrode pad 18 ($V_{Y2}$) with the wiring pattern Lm, the electrode pad 18 ($V_{Y2}$) providing external connection corresponding to the voltage detection element $P_{Y2}$.

The other ends of the piezoresistive elements $R_{Y2}$ and $R_{Y4}$ are electrically connected to the electrode pad 18 ($V_{VS}$) with the wiring patterns Ls and Lm, the electrode pad 18 ($V_{VS}$) providing connection to an external voltage source Vs. In addition, the other ends of the piezoresistive elements $R_{Y1}$ and $R_{Y3}$ are connected to the electrode pad 18 ($V_{GND}$) with the wiring patterns Ls and Lm, the electrode pad 18 ($V_{GND}$) providing connection to an external ground GND.

In addition, the piezoresistive elements $R_{Z2}$ and $R_{Z3}$ disposed on either side of the support-portion-side band-shaped portion 16a are electrically connected to each other by the wiring pattern Ls at ends thereof, thereby defining a voltage detection element $P_{Z1}$. The voltage detection element $P_{Z1}$ is electrically connected to the electrode pad 18 ($V_{Z1}$) with the wiring pattern Lm, the electrode pad 18 ($V_{Z1}$) providing external correction corresponding to the voltage detection element $P_{Z1}$. Similarly, the piezoresistive elements $R_{Z1}$ and $R_{Z4}$ disposed on either side of the support-portion-side band-shaped portion 16b are electrically connected to each other by the wiring pattern Ls at ends thereof, thereby defining a voltage detection element $P_{Z2}$. The voltage detection element $P_{Z2}$ is electrically connected to the electrode pad 18 ($V_{Z2}$) with the wiring pattern L, the electrode pad 18 ($V_{Z2}$) providing external connection corresponding to the voltage detection element $P_{Z2}$.

The other ends of the piezoresistive elements $R_{Z2}$ and $R_{Z1}$ are electrically connected to the electrode pad 18 ($V_{VS}$) with the wiring patterns Ls and Lm, the electrode pad 18 ($V_{VS}$) providing connection to an external voltage source Vs. In addition, the other ends of the piezoresistive elements $R_{Z3}$ and $R_{Z4}$ are connected to the electrode pad 18 ($V_{GND}$) with the wiring patterns Ls and Lm, the electrode pad 18 ($V_{GND}$) providing connection to an external ground GND.

Figure 8A:
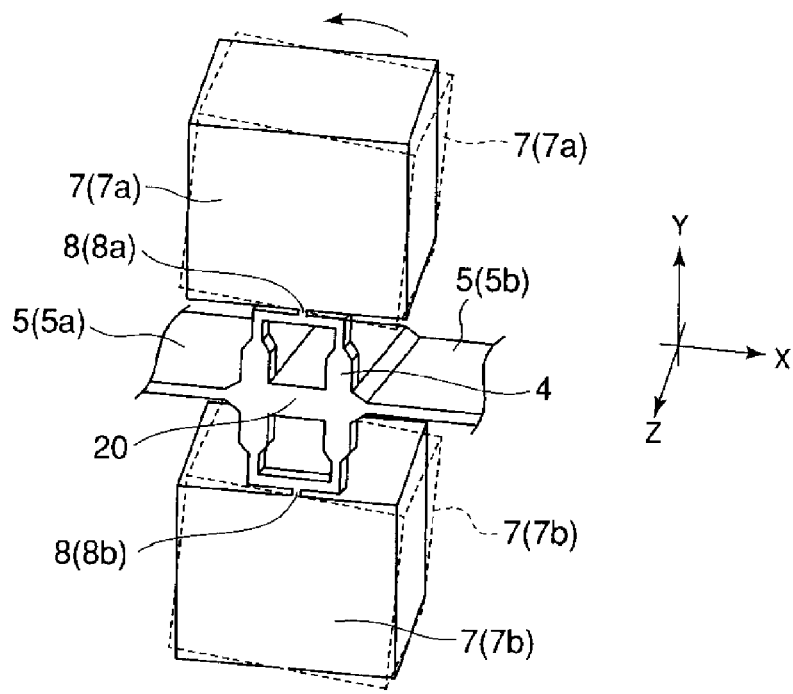
FIG. 8A is a schematic perspective view illustrating displacements of weight portions caused by an acceleration in the X-axis direction in the acceleration sensor according to a preferred embodiment of the present invention.

The acceleration sensor 1 according to the present preferred embodiment preferably has the above-described structure, and is capable of detecting accelerations in the following manner. For example, when an acceleration is applied in the X-axis direction, a force is generated in the X-axis direction due to the acceleration and is applied to the weight portions 7 (7a and 7b). When the force is applied to the weight portions 7 in the X-axis direction, the weight portions 7 (7a and 7b) swing away from reference locations shown by dotted lines in the model diagram of FIG. 8A. For example, as shown in FIG. 8A by the solid lines and in the schematic sectional view of FIG. 8B, the weight portions 7 swing in the X-axis direction. When the weight portions 7 are moved in the above-described manner, the beam portion 4 is deflected by the connecting portions 8. As a result, stress is applied to the beam portion 4 as described below.

Figure 8B:
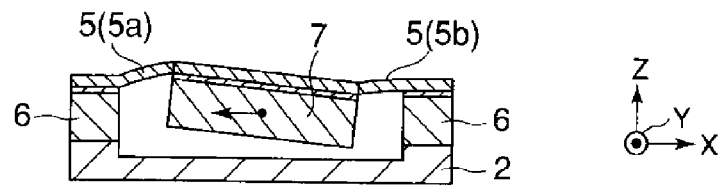
FIG. 8B is a schematic sectional view illustrating the displacements of the weight portions caused by the acceleration in the X-axis direction in the acceleration sensor according to a preferred embodiment of the present invention.
Figure 8C:
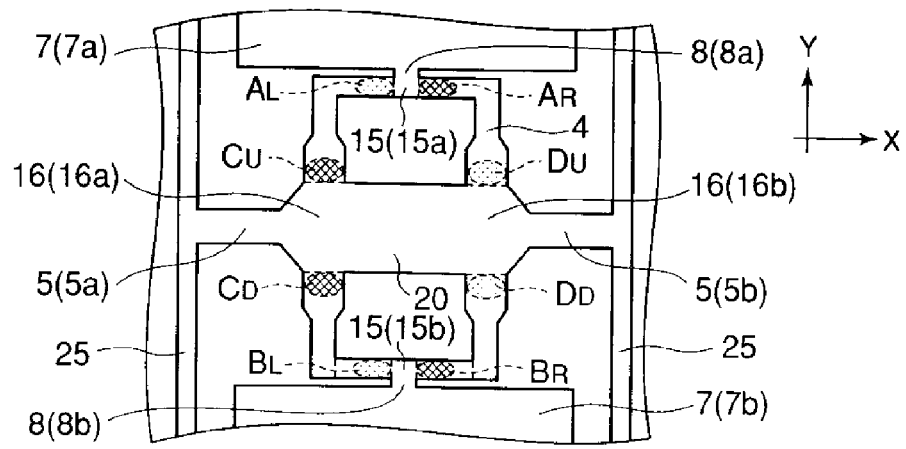
FIG. 8C is a schematic plan view illustrating the displacements of the weight portions caused by the acceleration in the X-axis direction in the acceleration sensor according to a preferred embodiment of the present invention.

Referring to the model diagram of FIG. 8C, when the weight portions 7 are moved as shown in FIGS. 8A and 8B, a tensile stress is generated in a left region $A_L$ of the connecting-portion-side band-shaped portion 15a of the beam portion 4. In addition, a compressive stress is generated in a right region $A_R$ of the connecting-portion-side band-shaped portion 15a. A tensile stress is generated in a left region $B_L$ of the connecting-portion-side band-shaped portion 15b. A compressive stress is generated in a right region $B_R$ of the connecting-portion-side band-shaped portion 15b. In addition, a compressive stress is generated in each of regions $C_U$ and $C_D$ on either side of the support-portion-side band-shaped portion 16a. A tensile stress is generated in each of regions $D_U$ and $D_D$ on either side of the support-portion-side band-shaped portion 16b.

In the beam portion 4, the piezoresistive elements $R_{X2}$, $R_{X1}$, $R_{X3}$, $R_{X4}$, $R_{Z2}$, $R_{Z3}$, $R_{Z1}$, and $R_{Z4}$ are disposed at the regions $A_L$, $A_R$, $B_L$, $B_R$, $C_U$, $C_D$, $D_U$, and $D_D$, respectively, at which the stresses are generated due to the acceleration applied to the weight portions 7 in the X-axis direction. Therefore, the electrical resistances of the piezoresistive elements $R_{X2}$, $R_{X1}$, $R_{X3}$, $R_{X4}$, $R_{Z2}$, $R_{Z3}$, $R_{Z1}$, and $R_{Z4}$ change due to the stresses applied due to the acceleration in the X-axis direction.

Table 1 shows the stresses applied in the regions at which the piezoresistive elements $R_{X1}$, $R_{X2}$, $R_{X3}$, $R_{X4}$, $R_{Z2}$, $R_{Z3}$, $R_{Z1}$, and $R_{Z4}$ are disposed and changes in the resistances of the piezoresistive elements when an acceleration is applied in the X-axis direction. The stresses applied in the regions at which the piezoresistive elements $R_{Y2}$, $R_{Y3}$, $R_{Y1}$, and $R_{Y4}$ are disposed and changes in the resistances of the piezoresistive elements are also shown in the table. In Table 1 and Tables 2 and 3, which will be described below, the minus sign (−) shown in the row "Stress" means that a compressive stress is generated and the plus sign (+) shown in the row "Stress" means that a tensile stress is generated. The signs + and − shown in the row "Resistance Change" correspond to the directions in which the resistance is changed. In the following descriptions, the stress and resistance change generated at each of the piezoresistive elements will be explained in detail with reference to Tables 1 to 3.

TABLE 1

| | X-axis Bridge | | | | Y-axis Bridge | | | | Z-axis Bridge | | | |
|---|---|---|---|---|---|---|---|---|---|---|---|---|
| | Piezoresistive Element | | | | | | | | | | | |
| | $R_{X1}$ | $R_{X2}$ | $R_{X3}$ | $R_{X4}$ | $R_{Y1}$ | $R_{Y2}$ | $R_{Y3}$ | $R_{Y4}$ | $R_{Z1}$ | $R_{Z2}$ | $R_{Z3}$ | $R_{Z4}$ |
| Stress | − | + | + | − | + | − | − | + | + | − | − | + |
| Resistance Change | − | + | + | − | + | − | − | + | + | + | − | − |

The state of the bridge circuit shown in FIG. 6A (X-axis bridge) when an acceleration is applied in the X-axis direction as shown in FIGS. 8A and 8B will be described below. In this case, each of the piezoresistive elements $R_{X1}$ and $R_{X4}$ causes a resistance change (resistance change in the − direction) based on a compressive stress (−). In addition, each of the piezoresistive elements $R_{X2}$ and $R_{X3}$ causes a resistance change (resistance change in the + direction) based on a tensile stress (+). Therefore, the resistances of the bridge circuit shown in FIG. 6A become unbalanced and the output from the bridge circuit shown in FIG. 6A changes. The amplitude of the change in the output from the bridge circuit shown in FIG. 6A varies in accordance with the amount of acceleration in the X-axis direction. Therefore, the amount of acceleration in the X-axis direction can be determined based on the output from the bridge circuit shown in FIG. 6A.

Next, the state of the bridge circuit show in FIG. 6C (Z-axis bridge) when an acceleration is applied in the X-axis direction as shown in FIGS. 8A and 8B will be described below. As shown in Table 1, in this case, each of the piezoresistive elements $R_{Z2}$ and $R_{Z3}$ included in the bridge circuit shown in FIG. 6C (Z-axis bridge) causes a resistance change based on a compressive stress (−). In addition, each of the piezoresistive elements $R_{Z1}$ and $R_{Z4}$ causes a resistance change based on a tensile stress (+). At this time, since the piezoresistive elements $R_{Z2}$ and $R_{Z3}$ extend in directions substantially perpendicular to each other, the resistances change in the opposite directions.

More specifically, as shown in Table 1, the resistance change in the piezoresistive element $R_{Z2}$ is (+), while the resistance change in the piezoresistive element $R_{Z3}$ is (−). This relationship also applies to the piezoresistive elements $R_{Z1}$ and $R_{Z4}$. The resistance change in the piezoresistive element $R_{Z1}$ is (+), while the resistance change in the piezoresistive element $R_{Z4}$ is (−). Thus, the resistance changes in the piezoresistive elements $R_{Z1}$ and $R_{Z2}$ and the resistance changes in the piezoresistive elements $R_{Z3}$ and $R_{Z4}$ are (+) and (−), respectively, and are opposite to each other. Therefore, the resistance changes in the piezoresistive elements $R_{Z2}$, $R_{Z3}$, $R_{Z1}$, and $R_{Z4}$ cancel one another. As a result, the output from the bridge circuit shown in FIG. 6c does not change significantly.

Next, portions of the beam portion where the piezoresistive elements $R_{Y1}$, $R_{Y2}$, $R_{Y3}$, and $R_{Y4}$ defining the bridge circuit shown in FIG. 6B (Y-axis bridge) are disposed will be considered. These portions of the beam portion are near the distal ends of the Y-axis-direction extending portions 4a and 4b. Therefore, only a small stress is generated. In addition, due to the symmetric arrangement, as shown in Table 1, the resistance change in the piezoresistive elements $R_{Y2}$ and $R_{Y3}$ is (−), while the resistance change in the piezoresistive elements $R_{Y1}$ and $R_{Y4}$ is (+). In other words, the resistances of the piezoresistive elements $R_{Y2}$ and $R_{Y3}$ and the resistances of the piezoresistive elements $R_{Y1}$ and $R_{Y4}$ change in opposite directions by substantially the same amount. Therefore, no significant voltage change occurs at the voltage resistance elements $P_{X1}$ and $P_{X2}$. As a result, when an acceleration is applied in the X-axis direction, the balanced state of the resistances in the bridge circuit shown in FIG. 6b is maintained. Accordingly, the output from the bridge circuit shown in FIG. 6b does not significantly change.

When an acceleration is applied in the Y-axis direction, a force corresponding to the acceleration is applied to the weight portions 7 (7a and 7b) in the Y-axis direction. In the present preferred embodiment, the vertical locations of the centers of gravity of the weight portions 7 are shifted from that of the support point of the beam portion 4 which supports the weight portions 7. Due to the difference in vertical location between the support point and the centers of gravity, when a force is applied to the weight portions 7 (7a and 7b) in the Y-axis direction, the weight portions 7a and 7b move from reference locations shown by dotted lines in the model diagram of FIG. 9A to, for example, locations shown in FIG. 9A by the solid lines and in the schematic sectional view of FIG. 9B. More specifically, one of the weight portions 7a and 7b (weight portion 7a in the example shown in FIGS. 9A and 9B) moves in the Y-axis direction while moving toward the base 2. The other one (weight portion 7b in the example shown in FIGS. 9A and 9B) moves in the Y-axis direction while moving upward away from the base 2. Accordingly, the connecting portions 8 and the beam portion 4 are deflected, and stresses described below are generated in the beam portion 4.

Figure 9A:
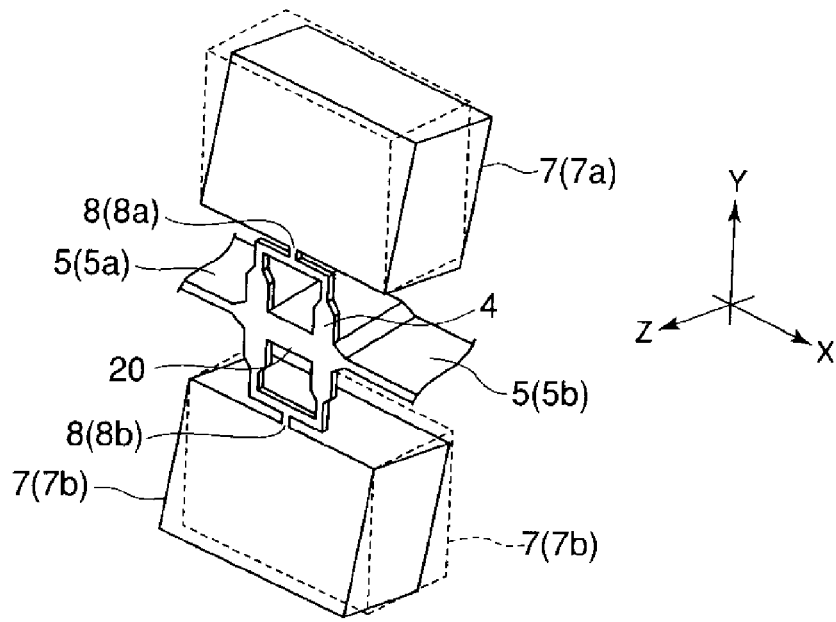
FIG. 9A is a schematic perspective view illustrating displacements of the weight portions caused by an acceleration in the Y-axis direction in the acceleration sensor according to a preferred embodiment of the present invention.
Figure 9B:
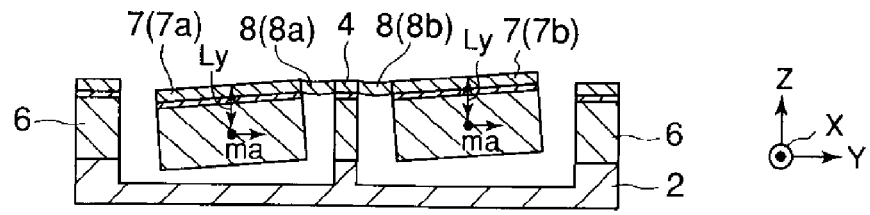
FIG. 9B is a schematic sectional view illustrating the displacements of the weight portions caused by the acceleration in the Y-axis direction in the acceleration sensor according to a preferred embodiment of the present invention.
Figure 9C:
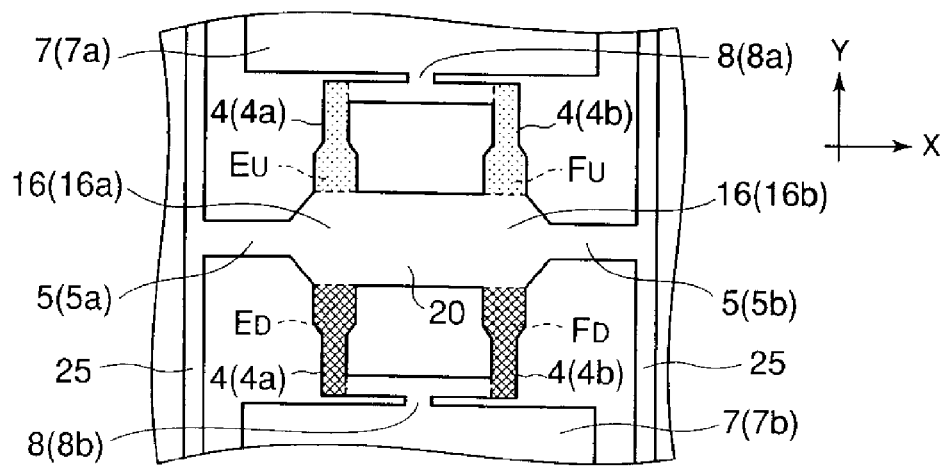
FIG. 9C is a schematic plan view illustrating the displacements of the weight portions caused by the acceleration in the Y-axis direction in the acceleration sensor according to a preferred embodiment of the present invention.

Movement of the weight portions 7 as shown in FIGS. 9A and 9B will be described below. A uniform moment is applied to the Y-axis-direction extending portions 4a in the beam portion 4 due to a moment (maLy) calculated as the product of a distance (Ly) from the surface of the beam 4 to the center of gravity of the weight portion 7 in the Z direction and the inertial force (ma). Accordingly, as shown in the model diagram of FIG. 9C, a tensile stress is generated in a region $E_U$ in the upper Y-axis-direction extending portion 4a. A compressive stress is generated in a region $E_D$ in the lower Y-axis-direction extending portion 4a. Similarly, a tensile stress is generated in a region $F_U$ in the upper Y-axis-direction extending portion 4b, and a compressive stress is generated in a region $F_D$ in the lower Y-axis-direction extending portion 4b.

In the beam portion 4, the piezoresistive elements $R_{Y2}$, $R_{Y3}$, $R_{Y1}$, and $R_{Y4}$ are disposed at the ends of the regions $E_U$, $E_D$, $F_U$, and $F_D$ at which the stresses are generated due to the acceleration in the Y-axis direction. Therefore, the electrical resistances of the piezoresistive elements $R_{Y2}$, $R_{Y3}$, $R_{Y1}$, and $R_{Y4}$ are changed when the stresses are applied due to the acceleration in the Y-axis direction.

Table 2 shows the stresses generated in the regions at which the piezoresistive elements $R_{Y2}$, $R_{Y3}$, $R_{Y1}$, and $R_{Y4}$ are disposed and changes in the resistances of the piezoresistive elements when an acceleration is applied in the Y direction. The stresses generated in the regions at which the piezoresistive elements $R_{Z2}$, $R_{Z3}$, $R_{Z1}$, and $R_{Z4}$ are disposed and changes in the resistances of the piezoresistive elements are also shown in the table.

TABLE 2

| | Y-axis Bridge | | | | Z-axis Bridge | | | |
| | Piezoresistive Element | | | | | | | |
| | $R_{Y1}$ | $R_{Y2}$ | $R_{Y3}$ | $R_{Y4}$ | $R_{Z1}$ | $R_{Z2}$ | $R_{Z3}$ | $R_{Z4}$ |
| Stress | + | + | − | − | + | + | − | − |
| Resistance Change | + | + | − | − | + | − | − | + |

In the bridge circuit shown in FIG. 6B, when the acceleration is applied in the Y-axis direction, each of the piezoresistive elements $R_{Y1}$ and $R_{Y2}$ causes, for example, a resistance change (+) based on a tensile stress (+), as shown in Table 2. In addition, each of the piezoresistive elements $R_{Y3}$ and $R_{Y4}$ causes, for example, a resistance change (−) based on a compressive stress (−). Therefore, the resistances of the bridge circuit shown in FIG. 6B become unbalanced and the output from the bridge circuit shown in FIG. 6B changes. The amplitude of the change in the output from the bridge circuit shown in FIG. 6B varies in accordance with the amount of acceleration in the Y-axis direction. Therefore, the amount of acceleration in the Y-axis direction can be determined based on the output from the bridge circuit shown in FIG. 6B.

In the present preferred embodiment, the piezoresistive elements $R_{Z2}$ and $R_{Z3}$ are disposed at the proximal ends of the Y-axis-direction extending portion 4a. In addition, the piezoresistive elements $R_{Z1}$ and $R_{Z4}$ are disposed at the proximal ends of the Y-axis-direction extending portion 4b. Therefore, when the stresses are generated in the beam portion 4 due to the acceleration in the Y-axis direction, the resistances of the piezoresistive elements $R_{Z2}$, $R_{Z3}$, $R_{Z1}$, and $R_{Z4}$ also change. Each of the piezoresistive elements $R_{Z2}$ and $R_{Z1}$ causes, for example, a resistance change based on a tensile stress (+). Each of the piezoresistive elements $R_{Z3}$ and causes, for example, a resistance change based on a compressive stress (−). The piezoresistive elements $R_{Z1}$ and $R_{Z3}$ extend in a direction substantially perpendicular to the direction in which the piezoresistive elements $R_{Z2}$ and $R_{Z4}$ extend. Therefore, the resistance changes caused by the stresses in the piezoresistive elements $R_{Z1}$ and are opposite to those in the piezoresistive elements $R_{Z2}$ and $R_{Z4}$.

As a result, the resistance of the piezoresistive element $R_{Z2}$ and that of the piezoresistive element $R_{Z4}$ are changed in opposite directions from a reference value obtained when no acceleration is applied. More specifically, as shown in Table 2, the resistance change in the piezoresistive elements $R_{Z2}$ is (+) and the resistance change in the piezoresistive elements $R_{Z4}$ is (−). Similarly, the resistance of the piezoresistive element $R_{Z1}$ and that of the piezoresistive element $R_{Z3}$ are changed in opposite directions from a reference value obtained when no acceleration is applied. More specifically, as shown in Table 2, the resistance change in the piezoresistive elements $R_{Z3}$ is (−) and the resistance change in the piezoresistive elements $R_{Z1}$ is (+). Therefore, the resistance changes in the $R_{Z2}$, $R_{Z4}$, $R_{Z1}$, and $R_{Z3}$ cancel one another. As a result, the output from the bridge circuit shown in FIG. 6C does not significantly change.

The piezoresistive elements $R_{X1}$, $R_{X2}$, $R_{X3}$, and $R_{X4}$ defining the bridge circuit shown in FIG. 6A are disposed at locations at which the stress change does not significantly occur when the acceleration is applied in the Y-axis direction. Therefore, the resistances of the piezoresistive elements $R_{X1}$, $R_{X2}$, $R_{X3}$, and $R_{X4}$ do not significantly change, and the output from the bridge circuit shown in FIG. 6A does not significantly change. Therefore, the acceleration in the Y-axis direction can be reliably detected based the output from the bridge circuit shown in FIG. 6B.

When an acceleration is applied in the Z-axis direction, a force corresponding to the acceleration is applied to the weight portions 7 (7a and 7b) in the Z-axis direction. Due to the force applied to the weight portions 7 in the Z-axis direction, the weight portions 7 (7a and 7b) move in the Z-axis direction from reference locations shown by dotted lines in the model diagram of FIG. 10A, for example, locations shown in FIG. 10A by the solid lines and in the schematic sectional view of FIG. 10B. Accordingly, the connecting portions 8 and the beam portion 4 are deflected, and stresses described below are generated in the beam portion 4.

Figure 10A:
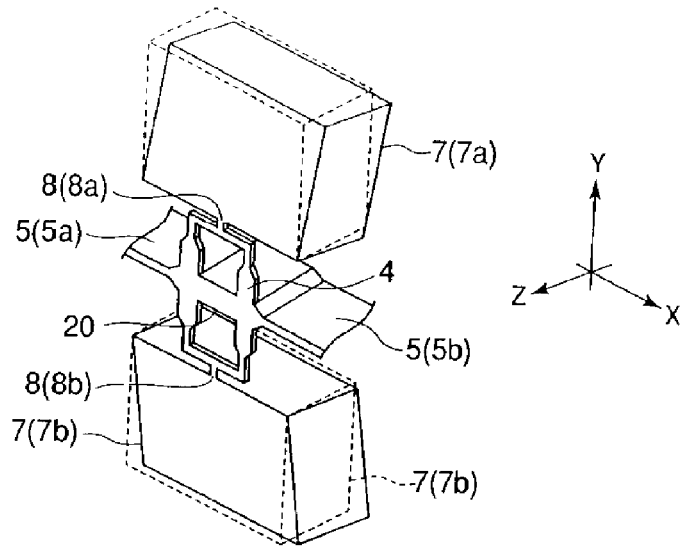
FIG. 10A is a schematic perspective view illustrating displacements of the weight portions caused by an acceleration in the Z-axis direction in the acceleration sensor according to a preferred embodiment of the present invention.
Figure 10B:
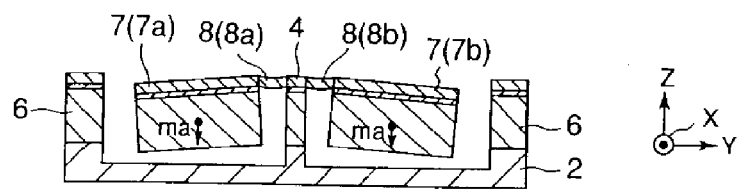
FIG. 10B is a schematic sectional view illustrating the displacements of the weight portions caused by the acceleration in the Z-axis direction in the acceleration sensor according to a preferred embodiment of the present invention.
Figure 10C:
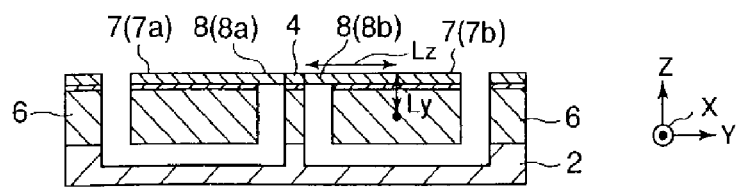
FIG. 10C is another schematic sectional view illustrating the displacements of the weight portions caused by the acceleration in the Z-axis direction in the acceleration sensor according to a preferred embodiment of the present invention.
Figure 10D:
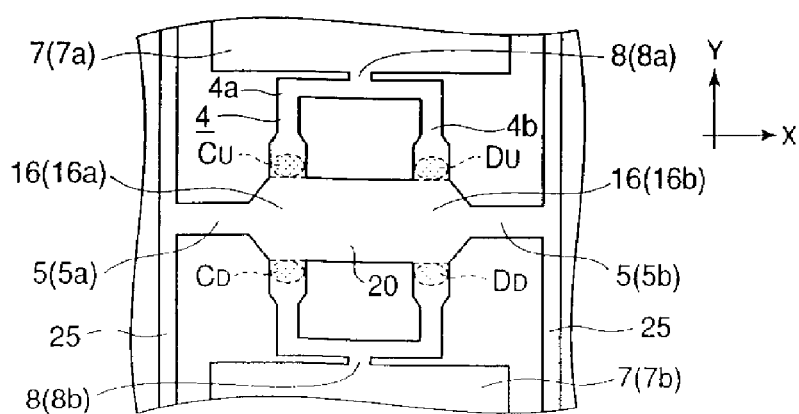
FIG. 10D is a schematic plan view illustrating the displacements of the weight portions caused by the acceleration in the Z-axis direction in the acceleration sensor according to a preferred embodiment of the present invention.

A case in which the weight portions 7 are moved as shown in FIGS. 10A and 10B will be described below. In this case, as shown in the model diagram of FIG. 10C, a bending moment (maLz) calculated as the product of a distance (Lz) from the beam portion 4 to the center of gravity in the Y direction and the inertial force. Therefore, a maximum bending moment is applied at locations farthest from the center of gravity, that is, at the proximal ends of the Y-axis-direction extending portions 4a and 4b (both sides of each of the support-portion-side band-shaped portions 16a and 16b). Accordingly, in the beam portion 4, a tensile stress is generated at each of the regions $C_U$, $C_D$, $D_U$, and $D_D$ adjacent to the support-portion-side band-shaped portions 16a and 16b.

Table 3 shows the stresses generated in the regions at which the piezoresistive elements $R_{Y2}$, $R_{Y3}$, $R_{Y1}$, and $R_{Y4}$ and the piezoresistive elements $R_{Z2}$, $R_{Z3}$, $R_{Z1}$, and $R_{Z4}$ are disposed and changes in the resistances of the piezoresistive elements when an acceleration is applied in the Y direction. As shown in Table 3, a tensile stress (+) is generated at each of the regions where the piezoresistive elements $R_{Z2}$, $R_{Z3}$, $R_{Z1}$, and $R_{Z4}$ are disposed.

TABLE 3

|  | Y-axis Bridge | | | | Z-axis Bridge | | | |
| --- | --- | --- | --- | --- | --- | --- | --- | --- |
|  | Piezoresistive Element | | | | | | | |
|  | $R_{Y1}$ | $R_{Y2}$ | $R_{Y3}$ | $R_{Y4}$ | $R_{Z1}$ | $R_{Z2}$ | $R_{Z3}$ | $R_{Z4}$ |
| Stress | + | + | + | + | + | + | + | + |
| Resistance Change | + | + | + | + | + | − | + | − |

The piezoresistive elements $R_{Z1}$ and $R_{Z3}$ are arranged so as to extend in the X-axis direction, and the piezoresistive elements $R_{Z2}$ and $R_{Z4}$ are arranged so as to extend in the Y-axis direction that is substantially perpendicular to the direction in which the piezoresistive elements $R_{Z1}$ and $R_{Z3}$ extend. Therefore, when the tensile stresses (+) are generated in the beam portion 4 as described above, the resistances are changed as shown in Table 3. More specifically, the piezoelectric resistance of each of the piezoresistive elements $R_{Z2}$ and $R_{Z4}$ extending in the Y direction and the piezoelectric resistance of each of the piezoresistive elements $R_{Z3}$ and $R_{Z1}$ extending in the X direction are changed in opposite directions. Namely, the resistance change in each of the piezoresistive elements $R_{Z2}$ and $R_{Z4}$ is (−), and the resistance change in each of the piezoresistive elements $R_{Z3}$ and $R_{Z1}$ is (+).

Therefore, when the acceleration is applied in the Z-axis direction, the resistances of the bridge circuit shown in FIG. 6C become unbalanced and the output from the bridge circuit shown in FIG. 6C changes. The amplitude of the change in the output from the bridge circuit shown in FIG. 6C varies in accordance with the amount of acceleration in the Z-axis direction. Therefore, the amount of acceleration in the Z-axis direction can be determined based on the output from the bridge circuit shown in FIG. 6C.

In the portions of the beam portion in which the piezoresistive elements $R_{X1}$, $R_{X2}$, $R_{X3}$, and $R_{X4}$ defining the bridge circuit shown in FIG. 6A are disposed, the stress is not significantly generated when the acceleration is applied in the Z-axis direction. Therefore, the balanced state of the resistances in the bridge circuit shown in FIG. 6a is maintained, so that the output from the bridge circuit shown in FIG. 6a does not significantly change. The piezoresistive elements $R_{Y1}$, $R_{Y2}$, $R_{Y3}$, and $R_{Y4}$ defining the bridge circuit shown in FIG. 6B are disposed at the ends of the Y-axis-direction extending portions 4a and 4b of the beam portion. In each of these portions, a tensile stress is generated, as shown by + in Table 3. Therefore, all of the resistances of the piezoresistive elements $R_{Y1}$, $R_{Y2}$, $R_{Y3}$, and $R_{Y4}$ vary in the + direction. Accordingly, when an acceleration is applied in the Z-axis direction, the balanced state of the resistances in the bridge circuit shown in FIG. 6B is maintained, so that the output from the bridge circuit shown in FIG. 6B does not significantly.

In the above-described manner, the acceleration sensor 1 according to the present preferred embodiment is capable of individually detecting accelerations in the three axial directions, i.e., in the X-axis direction, the Y-axis direction, and the Z-axis direction.

In the acceleration sensor 1, each of the Z-axis-direction acceleration detection unit, the Y-axis-direction acceleration detection unit, and the X-axis-direction acceleration detection unit provided on the beam portion 4 preferably includes piezoresistive elements. The electrical resistances of the piezoresistive elements are changed in response to the stress change in the beam portion 4 caused by the deformation of the beam portion 4. Due to this structure, the acceleration sensor 1 can easily and reliably detect the accelerations in the X, Y, and Z axis directions based on the changes in the electrical resistances of the piezoresistive elements.

In addition, the acceleration sensor 1 includes the bridge circuits arranged to detect the accelerations in the X, Z, and Z axis directions. Each of the bridge circuits detects an acceleration based on a difference between outputs from two voltage detection elements defined by the piezoresistive elements included in each of the acceleration detection units for the X, Y, and Z axis directions. Accordingly, the accelerations in the X, Y, and Z axis directions can be easily and reliably detected by the bridge circuits.

In the acceleration sensor 1, the bending moment in the Y-axis direction is determined by the distance Ly from the beam surface to the center of gravity in the Z-axis direction. In addition, the bending moment in the Z-axis direction is determined by the distance Lz from the beam 4 to the center of gravity in the Y-axis direction. Therefore, if the acceleration sensor 1 is configured to have a low-profile structure, Ly is reduced, and this leads to a reduction in the sensitivity in the Y-axis direction. However, in the present preferred embodiment, the piezoresistive elements $R_{Y1}$, $R_{Y2}$, $R_{Y3}$, and $R_{Y4}$ are disposed at the ends of the Y-axis-direction extending portions 4a and 4b, where the beam width is relatively small. Therefore, the acceleration detection sensitivity in the Y-axis direction is prevented from being reduced.

Even when the acceleration sensor 1 is configured to have a low-profile structure, no factor except for the mass m affects the sensitivity in the Z direction. When an acceleration is applied in the Z-axis direction, large bending moments are generated at the proximal ends of the Y-axis-direction extending portions 4a and 4b of the beam 4 (at both sides of the support-portion-side band-shaped portions 16). Therefore, a reduction in the sensitivity can be prevented by arranging the piezoresistive elements $R_{Z1}$, $R_{Z2}$, $R_{Z3}$, and $R_{Z4}$ at the above-mentioned locations. When the size of the weight portions 7 in the Y-axis direction is increased, Lz is also increased. Accordingly, the sensitivity in the Z-axis direction can be increased. Therefore, sensitivity in the Z-axis direction can be adjusted to a sensitivity equivalent to that in the Y-axis direction by increasing the size of the weight portions 7 in the Y direction.

As a result, even when the acceleration sensor 1 according to the present preferred embodiment is configured to have a low-profile structure, the sensitivities in the Y-axis direction and the Z-axis direction can be substantially matched to each other. Accordingly, a low-profile acceleration sensor having sufficient sensitivities in the three axial directions of X, Y, and Z can be obtained.

In the present preferred embodiment, the beam portion 4 is attached to the fixed portion 6 so as to be supported at two sides with the support portions 5 (5a and 5b). In addition, the weight portions 7 (7a and 7b) are attached to the beam portion 4 in a cantilever state with the connecting portions 8 (8a and 8b). Therefore, the distance between a portion of the fixed portion 6 to which the support portion 5a is connected and a portion of the fixed portion 6 to which the support portion 5b is connected can be reduced. Accordingly, even if the base 2 and the fixed portion 6 are distorted due to variation in the ambient temperature, for example, absolute displacement in the region between the above-described portions caused by distortion is relatively small.

The beam portion 4 preferably has a frame shape, and the frame-shaped beam portion 4 is preferably attached to the fixed portion 6 so as to be supported on two sides with the support portions 5 (5a and 5b). Therefore, if a stress is generated in the X-axis direction due to the distortion of the base 2 and the fixed portion 6, corner regions of the beam portion 4 are deformed so as to release the stress. If a stress is generated in the Y-axis direction due to the distortion of the base 2 and the fixed portion 6, the support portions 5 (5a and 5b) are deformed so as to release the stress. Thus, according to the present preferred embodiment, deflection of the beam portion 4 caused by the distortion of the base 2 and the fixed portion 6 can be reduced. Therefore, the problems caused by the ambient temperature variation can be reduced. The problems caused by the ambient temperature variation include, for example, an occurrence of temperature drift in which the output voltage values of the bridge circuits shown in FIGS. 6A to 6C vary in accordance with the temperature variation.

In the present preferred embodiment, the piezoresistive elements arranged to detect the accelerations are collectively disposed on the beam portion 4 disposed between the weight portions 7a and 7b. Therefore, all of the piezoresistive elements can be manufactured substantially as designed. As a result, according to the present preferred embodiment, differences between the outputs from the bridge circuits shown in FIGS. 6A to 6C can be easily reduced. More specifically, in the present preferred embodiment, the piezoresistive elements are preferably formed by doping boron (B) or phosphorus (P) into the Si layer included in the beam portion 4. Since the piezoresistive elements are arranged at locations that are close to each other, the doping concentration of boron or phosphorus is uniform between the piezoresistive elements. Therefore, the resistances of each bridge circuit can be easily set to a balanced state and the acceleration detection accuracy can be increased.

In addition, in the present preferred embodiment, since all of the piezoresistive elements are arranged at locations that are close to each other, the structure of the wiring patterns defining the bridge circuits shown in FIGS. 6A to 6C can be simplified. In addition, the wiring pattern Ls and the wiring pattern Lm are arranged so as to cross each other to form the circuit, so that the structure of the wiring patterns can be further simplified.

In the present preferred embodiment, the central axes of the support portions 5a and 5b in the X-axis direction are substantially aligned with each other, and the central axes of the connecting portions 8a and 8b in the Y-axis direction are substantially aligned with each other. The beam portion 4 is substantially symmetric about the X-direction central axis that passes through the central axes of the support portions 5a and 5b, and is also substantially symmetric about the Y-axis central axis that passes through the central axes of the connecting portions 8a and 8b. Therefore, the manner in which the beam portion 4 is deflected when the accelerations are applied can be simplified. As a result, the accuracy of acceleration detection using the stress change caused by the deflection of the beam portion 4 can be increased.

In addition, in the present preferred embodiment, the connecting-portion-side band-shaped portions 15 (15a and 15b) and the support-portion-side band-shaped portions 16 (16a and 16b) in the beam portion 4 are thicker than the other portions of the beam portion 4 in the Z-axis direction. Due to this thickness difference, significant stress differences can be obtained at the boundaries between the regions of the connecting-portion-side band-shaped portions 15 (15a and 15b) and the support-portion-side band-shaped portions 16 (16a and 16b), and the regions of the other portions of the beam portion 4. In the present preferred embodiment, the accelerations are detected using the stress change generated in the beam portion 4. Therefore, when significant stress differences can be obtained as described above, the accelerations in the three axial directions including the X-axis direction, the Y-axis direction, and the Z-axis direction can be detected independently of each other.

In addition, in the present preferred embodiment, the reinforcing portion 20 is provided in the frame-shaped beam portion 4 so that the rigidity of the beam portion 4 can be increased. Therefore, deflection of the beam portion 4 caused by the distortion of the base 2 and the fixed portion 6 can be reduced. Accordingly, in the present preferred embodiment, false detection of acceleration due to the distortion of the base 2 and the fixed portion 6 caused by, for example, thermal stress can be prevented. In particular, in the present preferred embodiment, the thickness of the reinforcing portion 20 in the Z-axis direction is set to be substantially equal to the thickness of the support-portion-side band-shaped portions 16. Therefore, the rigidity of the beam portion can be further increased by the reinforcing portion 20. Accordingly, the deflection of the beam portion 4 caused by the distortion of the base 2 and the fixed portion 6 can be further reduced and false detection of acceleration can be more reliably prevented.

In addition, in the present preferred embodiment, the support portions 5 (5a and 5b) are connected to the fixed portion 6 with the elastic portions 25 (25a, 25b) defined by the beams 26. Therefore, the beams 26 are elastically deformed due to the distortion of the fixed portion 6 in the X-axis direction. This elastic deformation reduces the stress applied to the support portions 5 by the fixed portion 6 due to the distortion of the fixed portion 6. Thus, according to the present preferred embodiment, distortion of the beam portion caused when the base 2 and fixed portion 6 are distorted due to temperature variation, for example, can be reduced. Therefore, the temperature drift of the outputs from the bridge circuits defined by the piezoresistive elements arranged to detect the accelerations can be suppressed. As a result, according to the present preferred embodiment, the reliability of the acceleration detection can be increased.

In addition, in the present preferred embodiment, the elastic portions 25 preferably include the beams 26 extending in a direction that crosses the direction in which the support portions 5 extend. Each of the beams 26 included in the elastic portions 25 is fixed to the fixed portion 6 at both ends thereof. The support portions 5 are supported by being connected to the beams 26 that are included in the elastic portions 25 and fixed to the fixed portion 6. Thus, the elastic portions 25 can be easily manufactured by the beams 26 and the above-described effects can be obtained.

Figure 11:
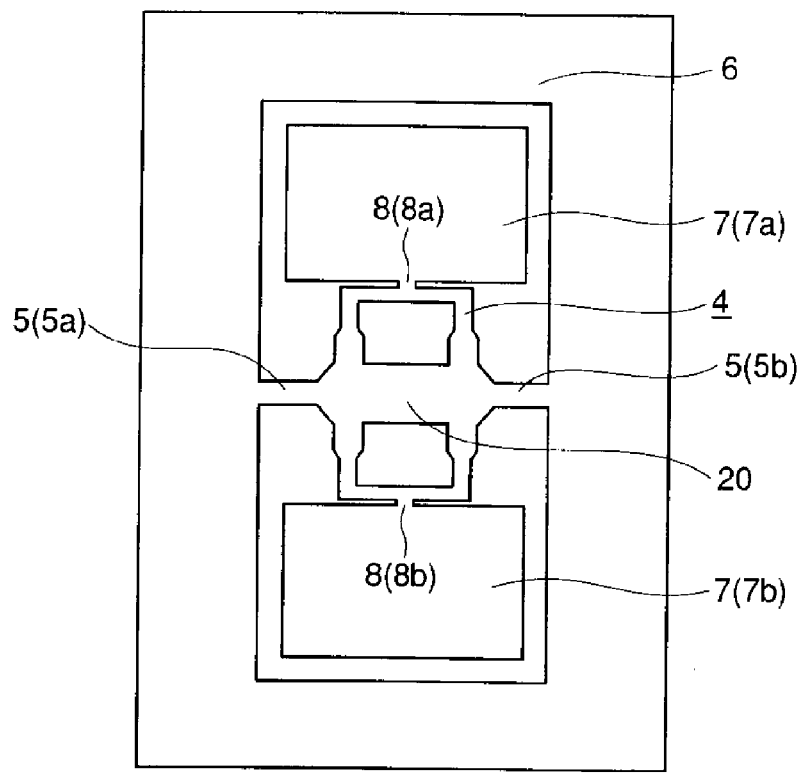
FIG. 11 is a diagram illustrating an acceleration sensor according to another preferred embodiment of the present invention.

The present invention is not limited to the above-described preferred embodiment, and various other preferred embodiments may also be provided. For example, as shown in a plan view of FIG. 11, the acceleration sensor 1 may not include the elastic portions 25 provided in the above-described preferred embodiment.

Figure 12:
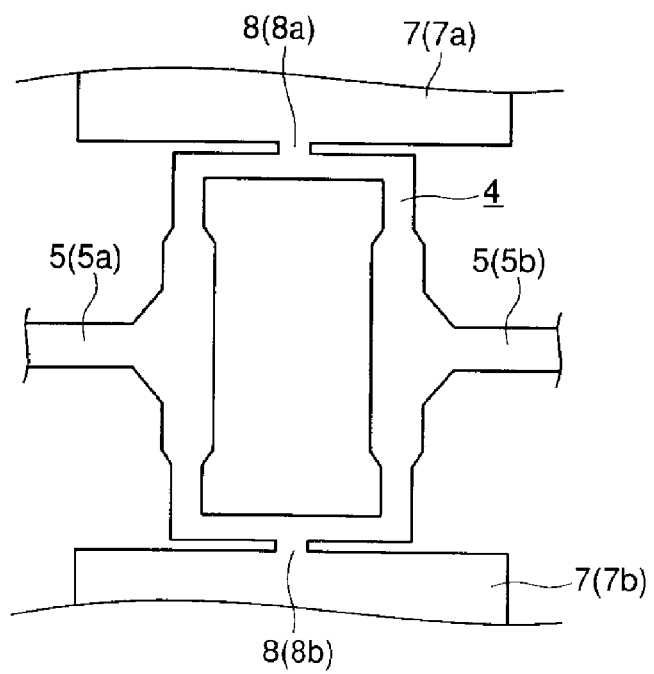
FIG. 12 is a diagram illustrating an acceleration sensor according to still another preferred embodiment of the present invention.

In addition, in the above-described preferred embodiment, the width of the reinforcing portion 20 is substantially equal to that of the support portions 5 (5a and 5b) at the ends connected to the beam portion 4. However, the width of the reinforcing portion 20 may also be greater than or less than that of the support portions 5 (5a and 5b). In addition, although the thickness of the reinforcing portion 20 in the Z-axis direction may preferably be substantially equal to the thickness of the support portions 5 (5a and 5b), it may also be less than the thickness of the support portions 5 (5a and 5b). Thus, the width and thickness of the reinforcing portion 20 may be suitably designed in consideration of the rigidity of the beam portion 4 itself. Alternatively, as shown in FIG. 12, the reinforcing portion 20 may be omitted.

In addition, in the above-described preferred embodiment, the thickness of the connecting-portion-side band-shaped portions 15 (15a and 15b) and the support-portion-side band-shaped portions 16 (16a and 16b) of the beam portion 4 in the Z-axis direction is greater than that of the other portions. However, the beam portion 4 may preferably also have a substantially constant thickness in the Z-axis direction over substantially the entire region thereof. In the case in which the beam portion 4 has a substantially constant thickness in the Z-axis direction over substantially the entire region thereof, the beam portion 5 can be more easily formed.

Figure 13A:
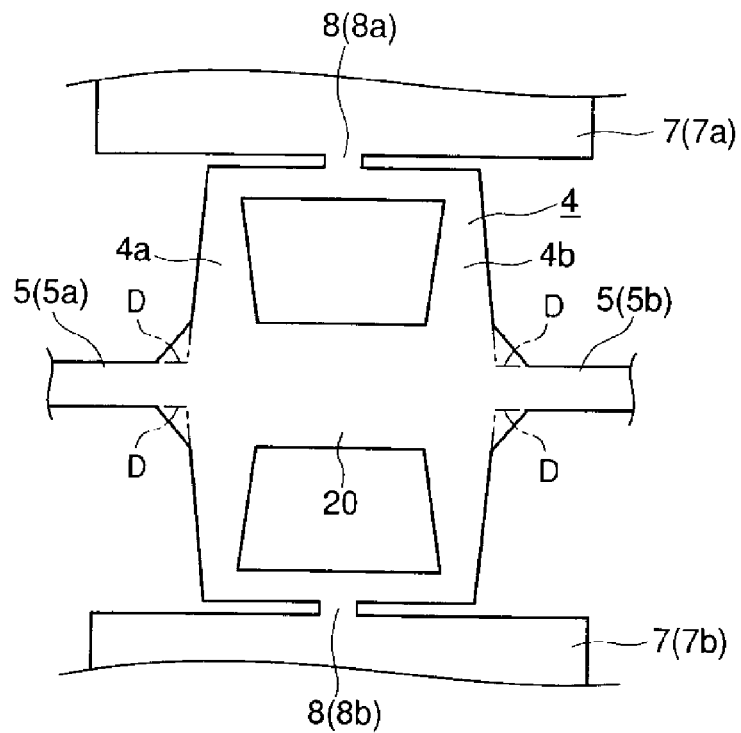
FIG. 13A is a diagram illustrating an acceleration sensor according to still another preferred embodiment of the present invention.
Figure 13B:
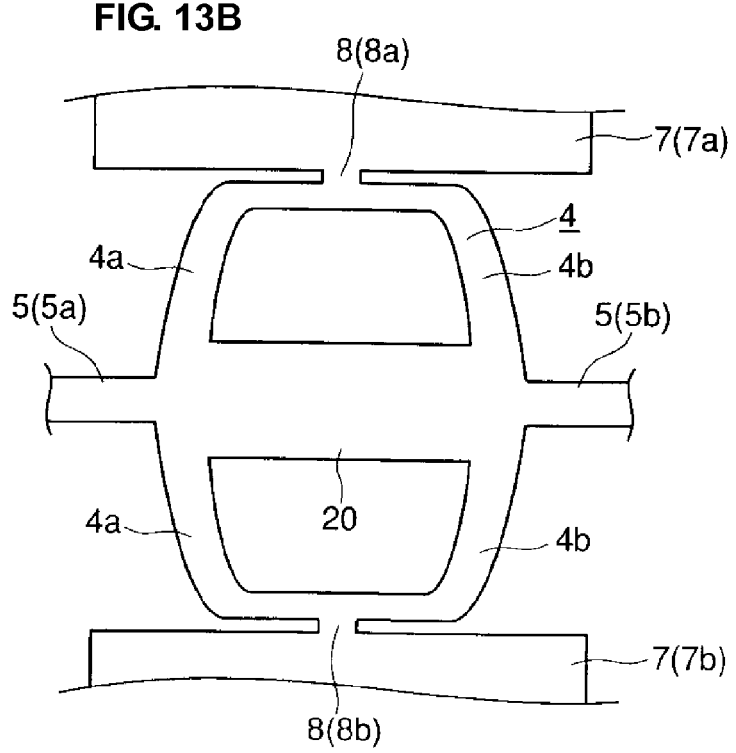
FIG. 13B is a diagram illustrating an acceleration sensor according to still another preferred embodiment of the present invention.

In addition, in the above-described preferred embodiment, the Y-axis-direction extending portions 4a and 4b of the frame-shaped beam portion 4 include substantially straight regions and tapered regions. However, as shown in FIG. 13A, each of the Y-axis-direction extending portions 4a and 4b may also preferably be tapered such that the width thereof is reduced from the proximal end to the distal end. Alternatively, as shown in FIG. 13B, each of the Y-axis-direction extending portions 4a and 4b may also preferably have a curved shape that extends substantially in the Y-axis direction.

In addition, in the above-described preferred embodiment, the width of each of the Y-axis-direction extending portions 4a and 4b of the beam portion 4 at the distal end thereof is less than that at the proximal end thereof. However, each of the Y-axis-direction extending portions 4a and 4b of the beam portion 4 may also preferably have a substantially uniform width. The thickness of each of the Y-axis-direction extending portions 4a and 4b at the distal end thereof may preferably be set to be less than that at the proximal end thereof.

In addition, in the above-described preferred embodiment, the frame-shaped beam portion 4 is substantially symmetric about the X-direction central axis, and is also substantially symmetric about the Y-axis central axis. However, the frame-shaped beam portion 4 may preferably be asymmetric about the X-direction central axis. The frame-shaped beam portion 4 may preferably be asymmetric about the Y-direction central axis.

In addition, in the above-described preferred embodiment, the width of the support portions 5a and 5b at the ends connected to the beam portion 4 is greater than the width of the support portions 5a and 5b at the distal ends thereof. However, the support portions 5a and 5b may also preferably have a substantially uniform width as shown by dashed lines D in FIG. 13A or as shown in FIG. 13B. The width of the support portions 5a and 5b is preferably as small as possible within a range in which a sufficient rigidity can be obtained.

Figure 14:
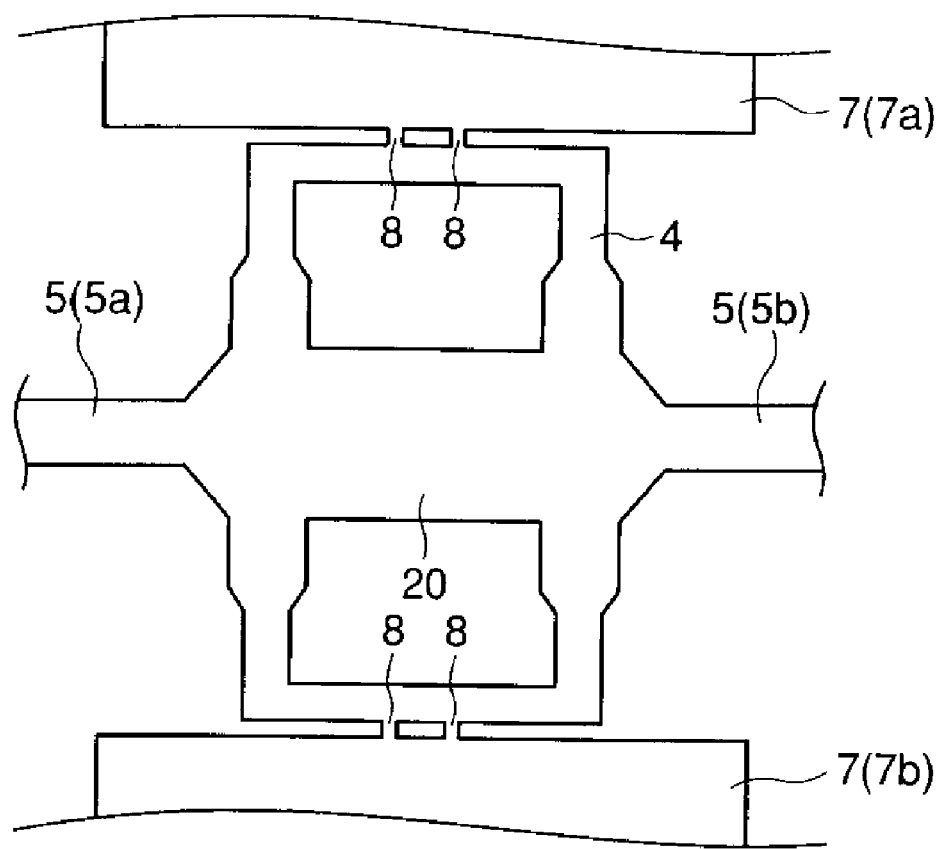
FIG. 14 is a diagram illustrating an acceleration sensor according to still another preferred embodiment of the present invention.

In addition, as shown in FIG. 14, two or more connecting portions 8 can preferably be provided with predetermined intervals therebetween at each end of the beam portion 4.

Figure 5:
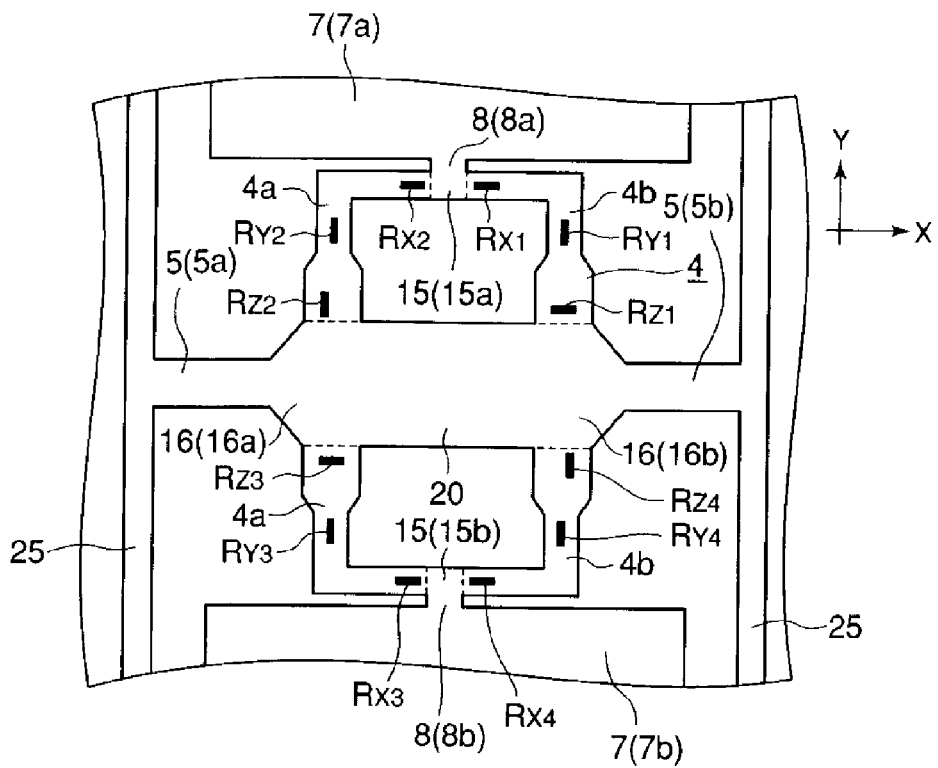
FIG. 5 is a diagram illustrating an example of an arrangement of piezoresistive elements provided on the beam portion of the acceleration sensor according to a preferred embodiment of the present invention.

In addition, in the above-described preferred embodiment, the piezoresistive elements arranged to detect the accelerations are arranged as shown in FIG. 5. However, the arrangement of the piezoresistive elements is not limited to that shown in FIG. 5, and may also be modified as necessary. The piezoresistive elements are arranged such that the acceleration in the X-axis direction, the acceleration in the Y-axis direction, and the acceleration in the Z-axis direction can be detected using the stress change caused by the deflection of the beam portion 4. In addition, the piezoresistive elements are arranged on the frame-shaped beam portion such that the Z-axis-direction acceleration detection unit is disposed near the proximal ends of the Y-axis-direction extending portions and the Y-axis-direction acceleration detection unit is disposed near the distal ends of the Y-axis-direction extending portions.

The wiring patterns arranged to connect the piezoresistive elements with one another to define the bridge circuits may also be modified as necessary. In other words, the wiring patterns are not limited to those shown in FIGS. 7A and 7B. For example, the wiring patterns may also preferably be arranged such that they do not cross each other.

In addition, the Z-axis-direction acceleration detection unit, for example, may also have the following structure including a total of four piezoresistive elements. That is, two of the four piezoresistive elements are provided at regions in which no stress change occurs when accelerations are applied. The other two are piezoresistive elements (for example, the piezoresistive elements $R_{Z1}$ and $R_{Z3}$) that are respectively disposed adjacent to the support-portion-side band-shaped portions 16a and 16b (at the proximal ends of the Y-axis-direction extending portions 4a and 4b). Then, the piezoresistive elements disposed adjacent to each other are electrically connected to each other to define two voltage detection elements.

Accordingly, a bridge circuit arranged to detect the acceleration in the Z-axis direction based on a voltage difference between the outputs from the two voltage detection elements can be obtained. Thus, a Z-axis-direction acceleration detection unit for detecting the acceleration in the Z-axis direction can be provided by this bridge circuit. The regions in which no stress change occurs when the accelerations are applied include the regions of, for example, the reinforcing portion 20, the support-portion-side band-shaped portions 16, and the support portions 5a and 5b. The electrical resistances of the piezoresistive elements disposed in these regions do not significantly change in accordance with the accelerations.

In addition, in the above-described preferred embodiment, the voltage detection element $P_{X1}$ is preferably provided by connecting the piezoresistive elements $R_{X1}$ and $R_{X2}$ to each other, and the voltage detection element $P_{X2}$ is preferably provided by connecting the piezoresistive elements $R_{X3}$ and $R_{X4}$ to each other. However, the voltage detection element $P_{X1}$ may also be provided by connecting the piezoresistive elements $R_{X2}$ and $R_{X4}$ to each other, and the voltage detection element $P_{X2}$ may also be provided by connecting the piezoresistive elements $R_{X1}$ and $R_{X3}$ to each other. In addition, in the above-described preferred embodiment, the voltage detection element $P_{Y1}$ is provided by connecting the piezoresistive elements $R_{Y2}$ and $R_{Y3}$ to each other, and the voltage detection element $P_{Y2}$ is provided by connecting the piezoresistive elements $R_{Y1}$ and $R_{Y4}$ to each other. However, the voltage detection element $P_{Y1}$ may also be provided by connecting the piezoresistive elements $R_{Y3}$ and $R_{Y1}$ to each other, and the voltage detection element $P_{Y2}$ may also be provided by connecting the piezoresistive elements $R_{Y2}$ and $R_{Y4}$ to each other. In addition, in the above-described preferred embodiment, the voltage detection element $P_{Z1}$ is provided by connecting the piezoresistive elements $R_{Z2}$ and $R_{Z3}$ to each other, and the voltage detection element $P_{Z2}$ is provided by connecting the piezoresistive elements $R_{Z1}$ and $R_{Z4}$ to each other. However, the voltage detection element $P_{Z1}$ may also be provided by connecting the piezoresistive elements $R_{Z2}$ and $R_{Z1}$ to each other, and the voltage detection element $P_{Z2}$ may also be provided by connecting the piezoresistive elements $R_{Z3}$ and $R_{Z4}$ to each other.

Figure 15:
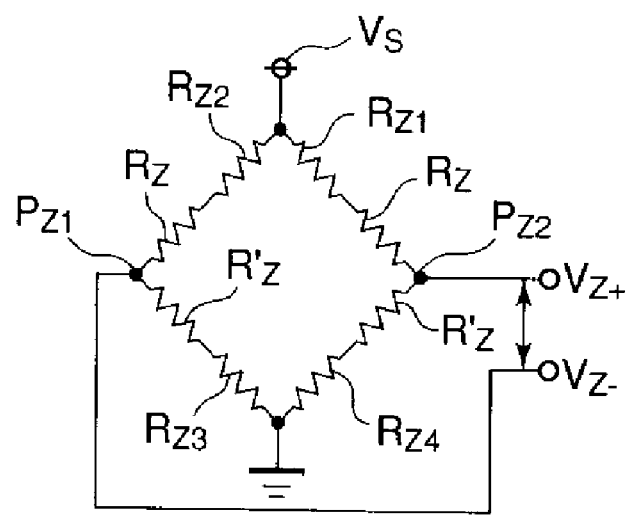
FIG. 15 is a diagram illustrating the circuit structure of an acceleration sensor according to still another preferred embodiment of the present invention.
Figure 16:
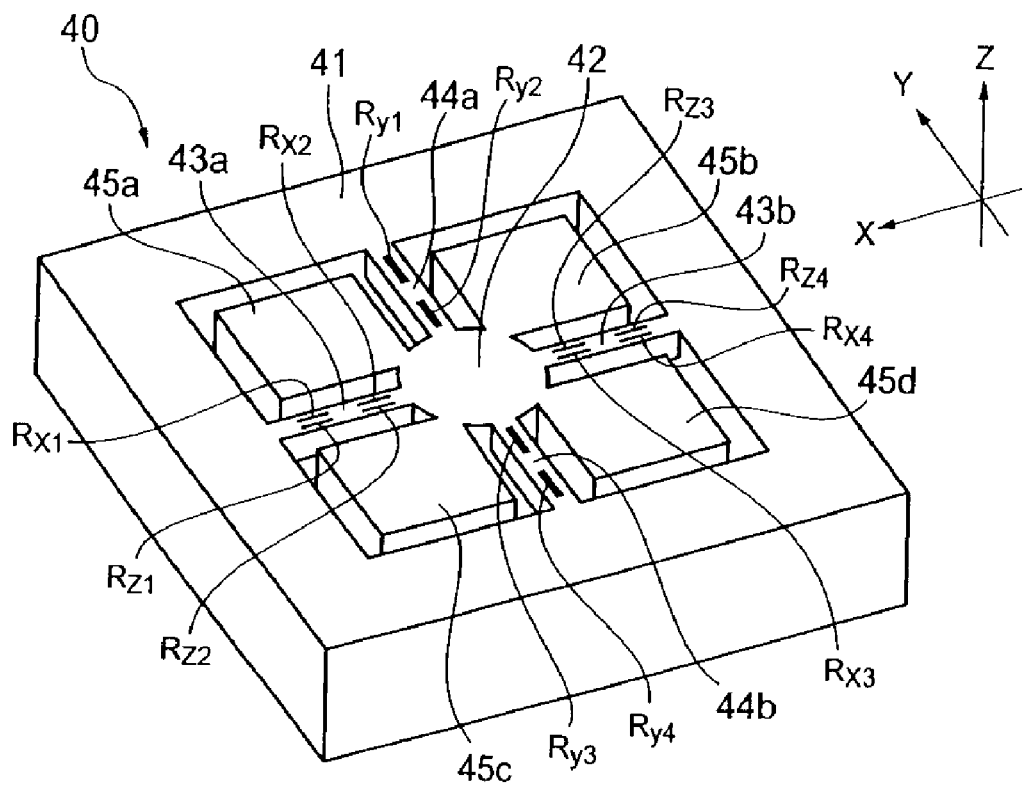
FIG. 16 is a schematic perspective view illustrating an example of a known acceleration sensor.
Figure 17A:
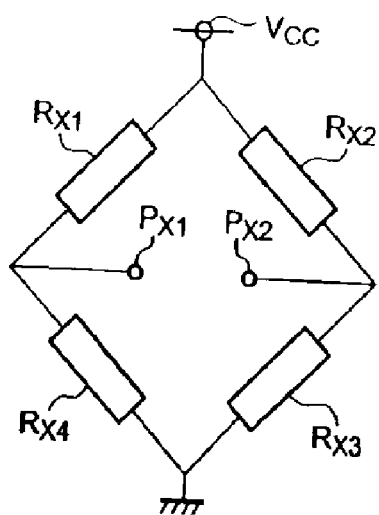
FIG. 17A is a circuit diagram illustrating a bridge circuit for detecting an acceleration in the X-axis direction in the acceleration sensor shown in FIG. 16.
Figure 17B:
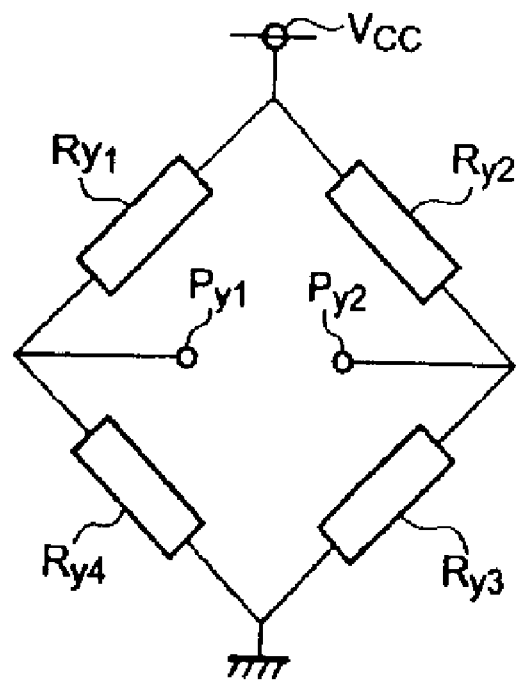
FIG. 17B is a circuit diagram illustrating a bridge circuit for detecting an acceleration in the Y-axis direction in the acceleration sensor shown in FIG. 16.
Figure 17C:
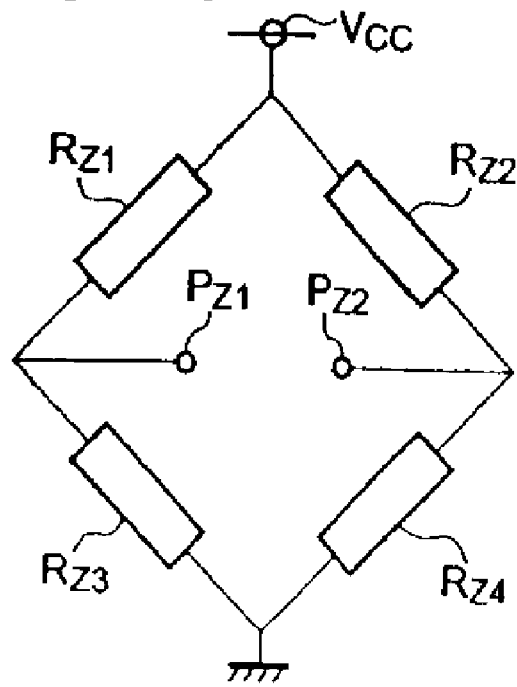
FIG. 17C is a circuit diagram illustrating a bridge circuit for detecting an acceleration in the Z-axis direction in the acceleration sensor shown in FIG. 16.

In addition, to make the sensitivities along the three axes of X, Y, and Z substantially equal to each other, resistances that do not vary in accordance with the accelerations may also be provided in the bridge circuits. For example, when the sensitivity along the Z axis is greater than those along the X and Y axes, the structure shown in FIG. 15 may preferably be provided. More specifically, sensitivity-adjusting piezoresistive elements $R_Z$, $R_Z$, $R_Z'$, and $R_Z'$ arranged to adjust the electrical resistances of the bridge circuit can be respectively connected to the piezoresistive elements $R_{Z1}$, $R_{Z2}$, $R_{Z3}$, and $R_{Z4}$ arranged to detect the acceleration in the Z-axis direction in series. The sensitivity-adjusting piezoresistive elements $R_Z$, $R_Z$, $R_Z'$, and $R_Z'$ are disposed at regions in which no substantially stress change occurs when the accelerations are applied.

Accordingly, a resistance change that occurs at each side of the bridge circuit is reduced as compared to the structure in which only the piezoresistive elements $R_{Z1}$, $R_{Z2}$, $R_{Z3}$, and $R_{Z4}$ are provided in the bridge circuit. Therefore, the amplitude of the change in the output from the bridge circuit relative to the amount of acceleration in the Z-axis direction can be substantially matched with the amplitudes of the changes in the outputs from the other bridge circuits relative to the amounts of accelerations in the X-axis direction and the Y-axis direction.

In addition, in the above-described preferred embodiment, each of the X-axis-direction acceleration detection unit, the Y-axis-direction acceleration detection unit, and the Z-axis-direction acceleration detection unit arranged to detect the accelerations preferably includes the piezoresistive elements. However, the acceleration detection units may also preferably be configured such that the acceleration in the X-axis direction, the acceleration in the Y-axis direction, and the acceleration in the Z-axis direction are determined by detecting the displacements of the weight portions 7 using capacitances.

In addition, in the above-described preferred embodiment, the fixed portion 6 preferably has a frame shape so as to surround the region in which the beam portion 4 and the weight portions 7 are disposed with intervals therebetween. However, the shape of the fixed portion 6 is not particularly limited as long as the beam portion 4 can be fixed to the base 2 so as to be supported on two sides with the support portions 5a and 5b, and it is not necessary that the fixed portion 6 have a frame shape.

In addition, in the above-described preferred embodiment, the beam portion 4, the support portions 5, the fixed portion 6, the weight portions 7, and the connecting portions 8 are preferably formed of the SOI substrate. However, it is not necessary that the above-described units be formed of the SOI substrate.

The acceleration sensor according to preferred embodiments of the present invention is not easily affected by the thermal stress. In addition, according to preferred embodiments of the present invention, accelerations in three axial directions including the X-axis direction, the Y-axis direction, and the Z-axis direction can be accurately detected with a single device. Therefore, the acceleration sensor according to preferred embodiments of the present invention is suitable for use in, for example, a small device that requires high-accuracy acceleration detection.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An acceleration sensor comprising
a base;
a frame-shaped beam portion disposed above a surface of the base in a floating state;
a beam-portion supporting/fixing unit including support portions and being arranged to connect the beam portion to the base so as to be supported on two sides via the support portions, the support portions extending outward in an X-axis direction from either side of the beam portion, the X axis, a Y axis, and a Z axis being substantially perpendicular to one another;
connecting portions provided above the surface of the base in a floating state and extending outward in the Y-axis direction from either side of the beam portion in the Y-axis direction; and
weight portions connected to distal ends of the respective connecting portions; wherein
the weight portions are movable in three axial directions including the X-axis direction, the Y-axis direction, and the Z-axis direction when the frame-shaped beam portion is deformed;
the beam portion is provided with an X-axis-direction acceleration detection unit arranged to detect an acceleration in the X-axis direction based on deflection of the beam portion caused by the movements of the weight portions in the X-axis direction, a Y-axis-direction acceleration detection unit arranged to detect an acceleration in the Y-axis direction based on deflection of the beam portion caused by the movements of the weight portions in the Y-axis direction, and a Z-axis-direction acceleration detection unit arranged to detect an acceleration in the Z-axis direction based on deflection of the beam portion caused by the movements of the weight portions in the Z-axis direction; and the Z-axis-direction acceleration detection unit is provided near proximal ends of Y-axis-direction extending portions of the frame-shaped beam portion and the Y-axis-direction acceleration detection unit is provided near distal ends of the Y-axis-direction extending portions, the Y-axis-direction extending portions extending in the Y-axis direction from locations at which the frame-shaped beam portion is supported by the support portions.

2. The acceleration sensor according to claim 1, wherein a width of the Y-axis-direction extending portions of the frame-shaped beam portion at the distal ends thereof is less than a width of the Y-axis-direction extending portions of the frame-shaped beam portion at the proximal ends thereof.

3. The acceleration sensor according to claim 1, wherein central axes of the support portions that extend in the X-axis direction from either side of the beam portion in the X-axis direction are substantially aligned with each other, central axes of the connecting portions that extend in the Y-axis direction from either side of the beam portion in the Y-axis direction are substantially aligned with each other, and the beam portion is substantially symmetric about an X-direction centerline that passes through the central axes of the support portions and is also substantially symmetric about a Y-direction centerline that passes through the central axes of the connecting portions.

4. The acceleration sensor according to claim 1, wherein the frame-shaped beam portion includes support-portion-side band-shaped portions and connecting-portion-side band-shaped portions, the support-portion-side band-shaped portions having substantially the same width as that of the support portions at the ends connected to the beam portion and extending in the X-axis direction from the respective support portions into the region of the beam portion, the connecting-portion-side band-shaped portions having substantially the same width as that of the connecting portions and extending in the Y-axis direction from the respective connecting portions into the region of the beam portion, the support-portion-side band-shaped portions and the connecting-portion-side band-shaped portions having a thickness greater than that of other portions.

5. The acceleration sensor according to claim 1, wherein a reinforcing portion is disposed in a space surrounded by the frame-shaped beam portion, the reinforcing portion extending in a direction in which the support portions are arranged on either side of the beam portion, the reinforcing portion being connected to the frame-shaped beam portion at both ends thereof.

6. The acceleration sensor according to claim 5, wherein a thickness of the reinforcing portion in the Z-axis direction is substantially equal to a thickness of support-portion-side band-shaped portions of the beam portion, the support-portion-side band-shaped portions having substantially the same width as that of the support portions at the ends connected to the beam portion and extending in the X-axis direction from the respective support portions into the region of the beam portion.

7. The acceleration sensor according to claim 1, wherein the frame-shaped beam portion has a substantially uniform thickness in the Z-axis direction over substantially the entire area thereof.

8. The acceleration sensor according to claim 1, wherein each of the Z-axis-direction acceleration detection unit, the Y-axis-direction acceleration detection unit, and the X-axis-direction acceleration detection unit provided on the beam portion includes a piezoresistive element having an electrical resistance that changes in accordance with a stress change that occurs in the beam portion due to deformation of the beam portion.

9. The acceleration sensor according to claim 8, wherein the X-axis-direction acceleration detection unit includes a total of four piezoresistive elements, the piezoresistive elements being disposed on either side of connecting-portion-side band-shaped portions of the beam portion in a width direction thereof, the connecting-portion-side band-shaped portions having substantially the same width as that of the connecting portions and extending in the Y-axis direction from the respective connecting portions into the region of the beam portion, the four piezoresistive elements including two pairs of piezoresistive elements having a voltage detection element provided therebetween so that two voltage detection elements are provided, the four piezoresistive elements of the X-axis-direction acceleration detection unit defining a bridge circuit arranged to detect the acceleration in the X-axis direction based on a difference between voltages output from the two voltage detection elements when the beam portion is deformed due to the acceleration in the X-axis direction;

the Y-axis-direction acceleration detection unit includes a total of four piezoresistive elements, the four piezoresistive elements being respectively disposed near the distal ends of the Y-axis-direction extending portions and including two pairs of piezoresistive elements having a voltage detection element provided therebetween so that two voltage detection elements are provided, the four piezoresistive elements of the Y-axis-direction acceleration detection unit defining a bridge circuit arranged to detect the acceleration in the Y-axis direction based on a difference between voltages output from the two voltage detection elements when the beam portion is deformed due to the acceleration in the Y-axis direction; and the Z-axis-direction acceleration detection unit includes a total of four piezoresistive elements, the four piezoresistive elements being respectively disposed at the proximal ends of the Y-axis-direction extending portions and including two pairs of piezoresistive elements having a voltage detection element provided therebetween so that two voltage detection elements are provided, the four piezoresistive elements defining a bridge circuit arranged to detect the acceleration in the Z-axis direction based on a difference between voltages output from the two voltage detection elements when the beam portion is deformed due to the acceleration in the Z-axis direction.

10. The acceleration sensor according to claim 8, wherein the X-axis-direction acceleration detection unit includes a total of four piezoresistive elements, the piezoresistive elements being disposed on either side of connecting-portion-side band-shaped portions of the beam portion in a width direction thereof, the connecting-portion-side band-shaped portions having substantially the same width as that of the connecting portions and extending in the Y-axis direction from the respective connecting portions into the region of the beam portion, the four piezoresistive elements including two pairs of piezoresistive elements having a voltage detection element provided therebetween so that two voltage detection elements are provided, the four piezoresistive elements of the X-axis-direction acceleration detection unit defining a bridge circuit arranged to detect the acceleration in the X-axis direction based on a difference between voltages output from the two voltage detection elements when the beam portion is deformed due to the acceleration in the X-axis direction;

the Y-axis-direction acceleration detection unit includes a total of four piezoresistive elements, the four piezoresistive elements being respectively disposed near the distal ends of the Y-axis-direction extending portions and including two pairs of piezoresistive elements having a voltage detection element provided therebetween so that two voltage detection elements are provided, the four piezoresistive elements of the Y-axis-direction acceleration detection unit defining a bridge circuit arranged to detect the acceleration in the Y-axis direction based on a difference between voltages output from the two voltage detection elements when the beam portion is deformed due to the acceleration in the Y-axis direction, and the Z-axis-direction acceleration detection unit includes a total of four piezoresistive elements, the four piezoresistive elements including two piezoresistive elements provided at separate regions at which substantially no stress change occurs when an acceleration is generated and two piezoresistive elements disposed at any of the proximal ends of the Y-axis-direction extending portions, the piezoresistive elements disposed adjacent to each other being electrically connected to each other so as to define two voltage detection elements, the four piezoresistive elements of the Z-axis-direction acceleration detection unit defining a bridge circuit arranged to detect the acceleration in the Z-axis direction based on a difference between voltages output from the two voltage detection elements when the beam portion is deformed due to the acceleration in the Z-axis direction.

11. The acceleration sensor according to claim 1, wherein the support portions are connected to the beam-portion supporting/fixing unit via elastic portions, the elastic portions being elastically deformed when the beam-portion supporting/fixing unit is distorted, thereby reducing a stress applied to the support portions from the beam-portion supporting/fixing unit due to the distortion of the beam-portion supporting/fixing unit.

12. The acceleration sensor according to claim 11, wherein the elastic portions include beams extending in a direction that crosses a direction in which the support portions extend, each of the beams included in the elastic portions being fixed to the beam-portion supporting/fixing unit at both ends thereof, the support portions being retained by the beam-portion supporting/fixing unit by being connected to the beams included in the elastic portions.

* * * * *